United States Patent
Fu et al.

[11] Patent Number: 6,010,644
[45] Date of Patent: Jan. 4, 2000

[54] LONG-LASTING PHOSPHOR

[75] Inventors: Jie Fu, Sagamihara; Yasuo Ochi, Kunitachi, both of Japan

[73] Assignee: Kabushiki Kaisha Ohara, Japan

[21] Appl. No.: 09/039,767

[22] Filed: Mar. 16, 1998

[30] Foreign Application Priority Data

| May 9, 1997 | [JP] | Japan | 9-136086 |
| Sep. 16, 1997 | [JP] | Japan | 9-269319 |
| Sep. 18, 1997 | [JP] | Japan | 9-272101 |

[51] Int. Cl.$^7$ ............ C09K 11/59; C09K 11/64; C09K 11/66; C09K 11/71
[52] U.S. Cl. ............ 252/301.4 R; 252/301.4 K; 252/301.6 R; 252/301.6 F
[58] Field of Search ............ 252/301.4 R, 301.4 F, 252/301.6 R, 301.6 F

[56] References Cited

U.S. PATENT DOCUMENTS

| 3,816,328 | 6/1974 | Levene | 252/301.4 F |
| 4,315,191 | 2/1982 | Konijnendijk et al. | 252/301.4 F |
| 4,733,126 | 3/1988 | Yamakawa et al. | 252/301.4 F |

FOREIGN PATENT DOCUMENTS

| 529956 | 3/1993 | European Pat. Off. | 252/301.4 R |
| 49-18778 | 2/1974 | Japan | 252/301.4 F |
| 49-20083 | 2/1974 | Japan | 252/301.4 F |
| 49-24888 | 3/1974 | Japan | 252/301.4 F |
| 59-102979 | 6/1984 | Japan | 252/301.4 R |
| 2047262 | 11/1980 | United Kingdom . | |
| 2301372 | 12/1996 | United Kingdom . | |

*Primary Examiner*—C. Melisa Koslow
*Attorney, Agent, or Firm*—Hedman, Gibson & Constigan, P.C.

[57] ABSTRACT

There is provided a long-lasting phosphor activated by divalent europium and having a chemical composition $RO \cdot a(Al_{1-x}Ga_x)_2O_3 \cdot b(Y_{1-y}Sc_y)_2O_3 \cdot cB_2O_3 \cdot dEu^{2+} \cdot eM^{n+}$ (where R is at least one selected from the group consisting of alkaline-earth metals including Ba, Sr, Ca and Mg and Zn, and M is at least one auxiliary activator selected from the group consisting of Nb, Zr, Bi, Mn, Sn, La, Ce, Pr, Nd, Sm, Gd, Tb, Dy, Ho, Er, Tm, Yb and Lu) wherein a, b, c, d, e, x and y are within ranges of:

$0.3 \leq a \leq 8$,
$0 < b \leq 0.2$,
$0.001 \leq c \leq 0.2$,
$0.001 \leq d \leq 0.3$,
$0.001 \leq e \leq 0.3$,
$0 \leq x \leq 1.0$, and
$0 \leq y \leq 1.0$.

There is also provided a long-lasting phosphor activated by divalent europium and having a chemical composition $RO \cdot a(Al_{1-x}Ga_x)_2O_3 \cdot b(Si_{1-y}Ge_y)O_2 \cdot cEu^{2+} \cdot dM^{n+}$ (where R is at least one selected from the group consisting of alkaline-earth metals including Ba, Sr, Ca and Mg and Zn. and M is at least one auxiliary activator selected from the group consisting of Nb, Zr, Bi, Mn, Sn, La, Ce, Pr, Nd, Sm, Gd, Tb, Dy, Ho, Er, Tm, Yb and Lu) wherein a, b, c, d, x and y are within ranges of:

$0.3 \leq a \leq 8$.
$0.001 \leq b \leq 2$,
$0.001 \leq c \leq 0.3$,
$0.001 \leq d \leq 0.3$.
$x \leq x < 1.0$, and
$0 \leq y \leq 1.0$.

39 Claims, 14 Drawing Sheets

LONG-LASTING PHOSPHOR

BACKGROUND OF THE INVENTION

This invention relates to a long-lasting phosphor and, more particularly, to a long-lasting phosphor with improved phosphorescence brightness and lifetime.

Fluorescence is a phenomenon that a material emits visible ray when excited by an excitation source applied from outside. A fluorescent lamp, a discharge tube and a cathode ray tube (CRT) emit fluorescence. A material which emits fluorescence is called a phosphor. When light emitted by a phosphor lasts after stoppage of excitation for duration of time sufficient for the light to be perceived by the eye, i.e., about 0.1 second or longer, the light is called phosphorescence. A phosphor which has a long persistent phosphorescence lasting for several hours at room temperature is called a long-lasting phosphor or a light storage phosphor. As long-lasting phosphors, there are two types of prior art materials, namely a sulfide represented by ZnS:Cu and an $Eu^{2+}$-activated alkaline-earth metal aluminate $RAl_2O_4$ (R being an alkaline-earth metal). The ZnS:Cu sulfide long-lasting phosphors have been practically used for several decades but they are disadvantageous in that their after-glow lasts for a relatively short duration of time, i.e., about three hours at the longest. Further, this type of phosphor has a fatal defect in that a decomposition reaction of $ZnS+H_2O$ $Zn+H_2S$ takes place under the coexistence of ultraviolet ray contained in the sunlight and moisture contained in the air, making the phosphor become black in color and, as a result, the after- glow characteristics significantly deteriorate within a relatively short period of time. For this reason, this type of phosphor has only limited applications such as a luminous watch and a night-time display of a location in a house.

On the other hand, recently developed $Eu^{2+}$-activated alkaline metal aluminate long lasting phophors (U.S. Pat. Nos. 5,376,303 and 5,424,006, Japanese Patent Application Laid-open Nos. 8-73845, 8-127772, 8-151573 and 8-151574) exhibit higher phosphorescence brightness, longer lifetime as well as better chemical durability and light resistance than the ZnS:Cu phosphors and, therefore, these aluminate phosphors are expected to have wide applications such as signs for preventing desasters, signs for indicating locations for keeping away from danger and decorations in addition to the existing applications for luminous watches and night time display in a house etc.

As applications of long-lasting phosphors are expanded, however, it has been found that the phosphorescence brightness of the prior art long-lasting phosphors is still not sufficiently high. Accordingly, it is desired for long-lasting phosphors to have further improved phosphorescence brightness and lifetime characteristics. It is also desired for long-lasting phosphors to have a characteristic of being excited promptly in a relatively short period of time.

It is, therefore, a first object of the invention to provide a novel long-lasting phosphor having a higher phosphorescence brightness and a shorter excitation time than the prior art aluminate long-lasting phosphors.

In a case where a long-lasting phosphor is used for decoration purposes such, for example, as decorating a signboard, it is desirable to use after-glow including as many colors as possible. The above described Japanese Patent Application Laid-open No. 8-151573 discloses that different colors can be imparted by combinations of the aluminate phosphor with dominant and auxiliary activators. In this laid-open application, however, the types of auxiliary activators available for use for imparting different colors are limited and therefore colors available are also limited within a relatively narrow range.

It is, therefore, a second object of the invention to provide a novel long-lasting phosphor which, while realizing a longer lasting phosphorescence and a higher brightness, is capable of providing a richer variety of colors in the emitted phosphorescence.

In a case where a long-lasting phosphor is used for manufacturing an ornament, since it is extremely difficult to form, e.g., a tube of a small thickness below 1 mm with the prior art aluminate long-lasting phosphor made by sintering, it is desired to provide a long-lasting phosphor which has overcome this problem.

It is, therefore, a third object of the invention to provide a novel long-lasting phosphor which is capable of producing an article whose shape is difficult to produce with a long-lasting phosphor made by sintering.

SUMMARY OF THE INVENTION

For achieving the above described first object of the invention, the inventor of the present invention has conducted experiments about the existing aluminate long-lasting phosphors activated by divalent europium and found that, by introducing yttrium oxide and/or scandium oxide into these long-lasting phosphors, phosphorescence brightness can be significantly enhanced while phosphorescence lifetime is maintained.

According to the invention which has achieved the first object of the invention, there is provided a $Eu^{2+}$-activated long-lasting phosphor having a chemical composition $RO \cdot a(Al_{1-x}Ga_x)_2O_3 \cdot b(Y_{1-y}Sc_y)_2O_3 \cdot cB_2O_3 \cdot dEu^{2+} \cdot eM^{n+}$ (where R is at least one selected from the group consisting of alkaline-earth metals including Ba, Sr, Ca and Mg and Zn, and M is at least one auxiliary activator selected from the group consisting of Nb, Zr, Bi, Sn, Ce, Pr, Nd, Sm, Gd, Tb, Dy, Ho, Er, Tm, Yb and Lu), n+ being the ion state of the activator with n being an integer wherein a, b, c, d, e, x and y are within ranges of:

$0.3 \leq a \leq 8$,
$0 < b \leq 0.2$,
$0.001 \leq c \leq 0.2$,
$0.001 \leq d \leq 0.3$,
$0.001 \leq e \leq 0.3$,
$0 \leq x < 1.0$, and
$0 \leq y \leq 1.0$.

In one aspect of the invention, the long-lasting phosphors further comprises 0.001–8 mol % Li.

In another aspect of the invention, the long-lasting phosphor has an emission peak at a wavelength in the vicinity of 440 nm and comprises $CaAl_2O_4$ and $Ca(Rm, Y)Al(Al_2O_7)$ crystals (where Rm is at least one element selected from the group consisting of Eu, Dy, Sc, La, Ce, Pr, Nd, Sm, Gd, Tb, Ho, Er, Tm, Yb and Lu).

In another aspect of the invention, the long-lasting phosphor has an emission peak at a wavelength in the vicinity of 440 nm and comprises $CaAl_2O_4$ and $Ca(Eu, Nd, Y)Al(Al_2O_7)$ crystals.

In another aspect of the invention, the long-lasting phosphor has an emission peak at a wavelength in the vicinity of 520 nm and comprises $SrAl_2O_4$ and $(Rm, Y)AlO_3$ crystals (where Rm is at least one element selected from the group consisting of Eu, Dy, Sc, La, Ce, Pr, Nd, Sm, Gd, Tb, Ho, Er, Tm, Yb and Lu).

In another aspect of the invention, the long-lasting phosphor has an emission peak at a wavelength in the vicinity of 520 nm and comprises $SrAl_2O_4$ and $(Eu, Dy, Y)AlO_3$ crystals.

In another aspect of the invention, the long-lasting phosphor has an emission peak at a wavelength in the vicinity of 490 nm and comprises $Sr_4Al_{14}O_{25}$ and $Al_5(Rm, Y)_3O_{12}$ (where Rm is at least one element selected from the group consisting of Eu, Dy, Sc, Ce, Pr, Nd, Sm, Gd, Tb, Ho, Er, Tm, Yb and Lu).

In still another aspect of the invention, the long-lasting phosphor has an emission peak at a wavelength in the vicinity of 490 nm and comprises $Sr_4Al_{14}O_{25}$ and $Al_5(Eu, Dy, Y)_3O_{12}$ crystals.

For achieving the above described second object of the invention, the inventor of the present invention has conducted experiments and found that, by introducing divalent europium as a dominant activator and other auxiliary activator or activators into the existing alkaline-earth aluminosilicates and selectively combining the composition ratio of $Al_2O_3+Ga_2O_3$ and $SiO_2+GeO_2$ and concentrations of divalent europium and auxiliary activator or activators within specific ranges, there are provided long-lasting phosphors which have a richer variety in wavelengths of emitted phosphorescence, i.e., a richer variety in colors of their emitted phosphorescence, than the prior art aluminate phosphors while maintaining sufficiently long-lasting phosphorescence lifetime and sufficiently high brightness.

According to the invention which has achieved the second object of the invention, there is provided a $Eu^{2+}$-activated long-lasting phosphor having a chemical composition RO·a$(Al_{1-x}Ga_x)_2O_3$·b$(Si_{1-y} Ge_y)O_2$·$cEu^{2+}$·$dM^{n+}$ (where R is at least one selected from the group consisting of alkaline-earth metals including Ba, Sr, Ca and Mg and Zn, and M is at least one auxiliary activator selected from the group consisting of Nb, Zr, Bi, Sn, Pr, Nd, Sm, Dy, Ho, Er, Tm, Yb and Lu), n+ being the ion state of the activator with n being an integer wherein a, b, c, d, x and y are within ranges of:

$0.3 \leq a \leq 8$, $0.001 \leq b \leq 2$, $0.001 \leq c \leq 0.3$, $0.001 \leq d \leq 0.3$, $0 \leq x < 1.0$, and $0 \leq y \leq 1.0$.

It has been found that the long-lasting phosphors achieving the second object of the invention can be obtained by the glass-ceramic process whereby an article whose shape is difficult to produce by sintering can be easily produced.

According to the invention which has achieved the third object of the invention, there is provided a glass-ceramic long-lasting phosphor having the same compositions as the above described long-lasting phosphors used for achieving the second object of the invention.

DETAILED DESCRIPTION OF THE INVENTION

I. The long-lasting phosphors having the chemical compositions of RO·a$(Al_{1-x}Ga_x)_2O_3$·b$(Y_{1-y}Sc_y)_2O_3$·$cB_2O_3$·$dEu^{2+}$·$eM^{n+}$ In these long-lasting phosphors, a represents the composition ratio of $Al_2O_3+Ga_2O_3$ or $Al_2O_3$ and b represents the composition ratio of $Y_2O_3$ and/or $Sc_2O_3$. By increasing b up to 0.2 within the range of $0.3 \leq a \leq 8$, a remarkable improvement in the phophorescence brightness has been observed. If b is increased beyond the above range, the brightness is decreased. In these long-lasting phosphors, c represents the composition ratio of $B_2O_3$. It has been found that $B_2O_3$ is effective in increasing the brightness within the range of $0.001 \leq c \leq 0.2$. The coefficient d which represents the concentration of the dominant activator should be within the range of $0.001 \leq d \leq 0.3$. If d is less than 0.001, the excitation light cannot be absorbed efficiently and, as result, no phosphorescence brightness which can be recognized by the naked eye can be produced. Conversely, if d exceeds 0.3, the brightness decreases due to concentration quenching. The coefficient e which represents the concentration of the auxiliary activator should be within the range of $0.001 \leq e \leq 0.3$. If e is less than 0.001, the effect of improving the phosphorescence brightness and lifetime is weak whereas if e exceeds 0.3, the brightness decreases.

The coefficient x represents the ratio of substitution of Al by Ga. A part of Al may be substituted by Ga and, in this case, a long-lasting phosphor which is superior to the prior art ZnS:Cu phosphor can still be realized. It is possible to substitute nearly all of Al by Ga but, to obtain a more excellent property, the substitution should be within the range of $x \leq 0.5$, preferably within the range of $x \leq 0.2$.

The coefficient y represents the ratio of substitution of Y by Sc. It is possible to substitute all of Y by Sc, but the cost of material will increase as the amount of $Sc_2O_3$ increases and, therefore, y should preferably be within the range of $y \leq 0.5$ and more preferably $y \leq 0.2$.

By adding Li to the long-lasting phosphors, the phosphorescence brightness further increases. If the amount of Li is less than 0.001%. the effect is not significant whereas if the amount of Li exceeds 8%, phosphorescence brightness decreases rather than increases. Therefore, the amount of Li should be within the range from 0.001 to 8%. A preferable amount of Li for obtaining a particularly good effect is within a range from 0.005% to 5%.

$Y_2O_3$ is an indispensable ingredient for improving phosphorescence brightness. It has been confirmed from X-ray diffraction analyses that, in the above described composition range, $CaAl_2O_4$ and $Ca(Rm, Y)Al(Al_2O_7)$ crystals (where Rm is at least one element selected from the group consisting of Eu, Dy, Sc, La, Ce, Pr, Nd, Sm, Gd, Tb, Ho, Er, Tm, Yb and Lu) are produced in the long-lasting phosphors having an emission peak at a wavelength in the vicinity of 440 nm, $SrAl_2O_4$ and $(Rm, Y)AlO_3$ crystals (where Rm is at least one element selected from the group consisting of Eu, Dy, Sc, La, Ce, Pr, Nd, Sm, Gd, Tb, Ho, Er, Tm, Yb and Lu) are produced in the long-lasting phosphors having an emission peak at a wavelength in the vicinity of 520 nm, and $Sr_4Al_{14}O_{25}$ and $Al_5(Rm, Y)_3O_{12}$ (where Rm is at least one element selected from the group consisting of Eu, Dy, Sc, La, Ce, Pr, Nd, Sm, Gd, Tb, Ho, Er, Tm, Yb and Lu) are produced in the long-lasting phosphors having an emission peak at a wavelength in the vicinity of 490 nm.

From these results, it is assumed that a part of the added $Y_2O_3$ is incorporated into the aluminate crystal but the rest of this ingredient is incorporated into the second phase. In the former case, yttrium is considered to contribute to promoting the formation of carrier traps or stabilizing carrier traps which contribute directly to the enhancement of phosphorescence brightness whereas in the latter case, the second phase is considered to play a role in stabilizing the carrier traps by modifying the aluminate crystal. For these reasons, as will become apparent from the examples to be described later, phosphorescence brightness is remarkably increased by addition of the $Y_2O_3$ ingredient and, moreover, the excitation time is shortened by half or over. Particularly excellent long-lasting phosphorescent characteristics (brightness and lifetime) are obtained in the long-lasting phosphors comprising the $CaAl_2O_4$ and Ca(Eu, Nd, Y)Al $(Al_2O_7)$ crystals with an emission peak at a wavelength in the vicinity of 440 nm, the long-lasting phosphors comprising the $SrAl_2O_4$ and (Eu, Dy, Y)$AlO_3$ crystals with an emission peak at a wavelength in the vicinity of 520 nm, and the long-lasting phosphors comprising the $Sr_4Al_{14}O_{25}$, $SrAl_2O_4$ and $Al_5(Eu, Dy, Y)_3O_{12}$ with an emission peak at wavelength in the vicinity of 490 nm. In producing the long lasting phosphors of the present invention, compounds of phosphorus such as $NH_4H_2PO_4$, compounds of halogen such as $NH_4F$, $NH_4Cl$, $NH_4B$ may be added as a flux. An optimum amount of the addition is within a range of 0.05–8 mol %.

The long-lasting phosphors of the above described chemical compositions can be produced by sintering. As starting materials of the long-lasting phosphors according to the invention, the following materials may be employed.

(1) As the RO ingredient, oxides, carbonates, nitrates halogenides etc.
(2) As the $Al_2O_3$ ingredient, oxides, nitrates, hydroxides, halogenides etc.
(3) As the $Y_2O_3$ ingredient, oxides, nitrates, halogenides etc.
(4) As the Rm ingredient, oxides, carbonates, nitrates, halogenides etc.
(5) As the Li ingredient, $Li_2CO_3$, $LiNO_3$, $Li_2SO_4$, $Li_3BO_3$, $Li_2SiO_3$, $Li_3PO_4$, $Li_3WO_3$, $Li_3MoO_3$, halogenides etc.

These materials are weighed at a predetermined ratio and mixed sufficiently. The mixed materials are put in an aluminum crucible and sintered in a reducing atmosphere under the temperature within a range from 1100° C. to 1600° C. for about 1 hour to ten hours. In some cases, depending upon the composition of the phosphor, a sintered material may be crushed and subjected to sintering again under the same sintering conditions.

II. The long-lasting phosphors having the chemical compositions of $RO \cdot a(Al_{1-x}Ga_x)_2O_3 \cdot b(Si_{1-y}Ge_y)O_2 \cdot cEU^{2+} \cdot dM^{n+}$ In the past, various phosphors comprising alkaline-earth metal alumino-slilicate activated by divalent europium have been developed. For example, Japanese Patent Publication No. 47- 41 discloses a phosphor consisting of $RO \cdot aAl_2O_3 \cdot 2SiO_2$:Eu (where R is an alkaline-earth metal) and Japanese Patent Publication No. 7-45656 discloses a phosphor consisting of $(Ba_w Ca_x Mg_y Eu_z)O \cdot aAl_2O_3 \cdot bSiO_2$. These phosphors exhibit a luminescence characteristic which is different from that of the phosphors which do not contain silicon. The difference is considered to result from the difference in the ligand field of the host. Since emission of $Eu^{2+}$ is due to $4f^7–4f^6 5d$ transition, it is strongly affected by the chemical environment about $Eu^{2+}$, i.e., strength of the ligand field of the host accepting $Eu^{2+}$. These prior art alkaline-earth metal alumino-silicate phosphors have sufficient luminescence brightness necessary for practical uses but, since they have all been developed for fluorescence lamps and cathode ray tubes, they have only a very short after-glow time. For example, in the case of the $RO \cdot Al_2O_3 \cdot 2SiO_2$:Eu phosphor disclosed in the above cited Japanese Patent Publication No. 47-41, the afterglow time is extremely short with its time constant of less than 1 microsecond. In other words, these phosphors emit luminescence while excited by light but the luminescence decays quickly after stopping the irradiation and substantially do not have a long-lasting phosphorescence characteristic.

It is known that the higher the electron density of oxygen ion, i.e., the higher the basicity of host, the stronger is the ligand field. This would result in a larger splitting of 5d energy levels of $Eu^{2+}$ and hence lower the lowest level of 5d. For this reason, as basicity of host increases, emission bond due to 5d-4f transition of $Eu^{2+}$ will shift toward the long wavelength side. If, therefore, the long-lasting phosphorescence characteristic is realized in the prior art alkaline-earth metal alumino-silicate phosphors by adding an auxiliary activator which is effective in extending the phosphorescence lifetime, because strength of the ligand field of the host can be changed in a wide range by adjusting the ratio of $Al_2O_3+Ga_2O_3$ to $SiO_2+GeO_2$ which have different basicity from each other, it is expected that long-lasting phosphors which are richer in variety of colors in the emitted phosphorescence than the prior art aluminate long-lasting phosphors can be provided.

Furthermore, an alkaline-earth metal aluminosilicate can be formed to a glass-ceramic by melting materials and glassifying them and subjecting the glass to proper heat treatments. The above described alkanline-earth metal alumino-silicate according to the invention can be formed to glass-ceramic phosphors having the chemical compositions of $RO \cdot a(Al_{1-x}Ga_x)_2O_3 \cdot b(Si_{1-y}Ge_y)O_2 \cdot cEu^{2+} \cdot dM^{n+}$ (where R is at least one selected from the group consisting of alkaline-earth metals including Ba, Sr, Ca and Mg and Zn, and M is at least one auxiliary activator selected from the group consisting of Nb, Zr, Bi, Mn, Sn, La, Ce, Pr, Nd, Sm, Gd, Tb, Dy, Ho, Er, Tm, Yb and Lu). With such glass-ceramic long-lasting phosphors, an article such as a thin tube having thickness below 1 mm which is difficult to produce with the prior art ceramic long-lasting phosphor made by sintering can be made easily.

In these long-lasting phosphors according to the invention, a represents the composition ratio of $Al_2O_3$ or $Al_2O_3+Ga_2O_3$ and b represents the composition ratio of $SiO_2$ and/or $GeO_2$. The coefficients a and b interact each other and, by adjusting values of these coefficients, strength of the ligand field of the host is changed and, as a result, emitting wavelength, phosphorescence brightness and lifetime also are also changed. If a is made smaller and b is made larger, or a is made larger and b is made smaller, the phosphorescence brightness increases. There are however limits in the ranges of a and b. If b is less than 0.001 in the range of $0.3 \leq a \leq 8$, the effect of Si and/or Ge is weak whereas if b exceeds 2, a long-lasting phosphor with a high phosphorescence brightness cannot be produced. Likewise, if a is outside of the range of $0.3 \leq a \leq 8$ within the range of b of $0.001 \leq b \leq 2$, a long-lasting phosphor with a high phosphorescence brightness cannot be produced. The coefficients a and b should preferably be within the ranges of $0.3 \leq a \leq 6$ and $0.001 \leq b \leq 2$ and, more preferably be within the ranges of $0.5 \leq a \leq 3$ and $0.002 \leq b \leq 2$.

The coefficient c which represents the concentration of the dominant activator should be within the range of $0.001 \leq c \leq 0.3$. If c is less than 0.001, the excitation light cannot be absorbed efficiently and, as result, no long-lasting phosphorescence intensity which can be recognized by the naked eye can be produced. Conversely, if c exceeds 0.3, the phosphorescence brightness decreases due to concentration quenching. Preferably, c should be within a range of $0.001 \leq c \leq 0.2$ and, more preferably, c should be within a range of $0.002 \leq c \leq 0.1$. The coefficient d which represents the concentration of the auxiliary activator should be within the range of $0.001 \leq d \leq 0.3$. If d is less than 0.001, the effect of improving the long-lasting phosphorescence intensity and its lifetime is weak whereas if d exceeds 0.3, the phosphorescence brightness decreases. The coefficient d should preferably be within a range of $0.001 \leq d \leq 0.2$ and, more preferably, be within a range of $0.002 \leq d \leq 0.15$.

The coefficient x represents the ratio of substitution of Al by Ga. A part of Al may be substituted by Ga and, in this case, a long-lasting phosphor which is superior to the prior art ZnS:Cu phosphors can still be realized. It is possible to substitute nearly all of Al by Ga but, to obtain a more excellent property, the substitution should be within the range of $x \leq 0.5$, preferably within the range of $x \leq 0.2$.

The coefficient y represents the ratio of substitution of Si by Ge. Even in a case where a part of Si is substituted by Ge, a long-lasting phosphor which is superior to the prior art ZnS:Cu phosphors in the phosphorescence brightness and its lifetime can be produced. It is possible to substitute all of Si by Ge but, to obtain a more excellent property, the substitution should be within the range of $y \leq 0.5$, preferably within the range of $y \leq 0.2$.

In producing the long-lasting phosphors of the present invention, boric acid, $Li_2CO_3$, LiCl or compounds of phosphorus or other compound may be added as a flux. An optimum amount of addition of such flux is within a range from 0.05 mol % to 8 mol %.

The long-lasting phosphors of the above described chemical compositions can be produced by sintering. More specifically, oxides which are constituents of the long-lasting phosphor or compounds such as carbonates or nitrates which can be converted to oxides by thermal decomposition are weighed at a predetermined ratio and mixed sufficiently. The mixed materials are put in an aluminum crucible and sintered in a reducing atmosphere under the temperature within a range from 1100° C. to 1600° C. for about 1 hour to ten hours. In some cases, depending upon the composition, the obtained phosphors may be crushed and subjected to sintering again under the same sintering conditions.

These long-lasting phosphors of the invention can also be produced by the glass-ceramic process in the following manner:

Starting materials are weighed at a predetermined ratio and mixed sufficiently. Then, the mixed materials are put in an aluminum crucible and melted in a reducing atmosphere under a temperature within a range from 1300° C. to 1600° C. for about one to three hours. The melt is cast onto an iron plate to form a sheet glass. This glass is further heat treated in a reducing atmosphere under a temperature within a range from 950° C. to 1250° C. for about one to twelve hours whereby a glass-ceramic long-lasting phosphor comprising a crystal having a chemical composition $RO \cdot a(Al_{1-x}Ga_x)_2O_3 \cdot b(Si_{1-y}Ge_y)O_2 \cdot cEu^{2+} \cdot dM^{n+}$ (where R is at least one selected from the group consisting of alkaline-earth metals including Ba, Sr, Ca and Mg and Zn, and M is at least one auxiliary activator selected from the group consisting of Nb, Zr, Bi, Mn, Sn, La, Ce, Pr, Nd, Sm, Gd, Tb, Dy, Ho, Er, Tm, Yb and Lu) is produced. With such glass-ceramic process, an article such as a thin tube which is difficult to produce by the ceramic long-lasting phosphor can be formed easily. Besides, in ceramics made by sintering, there exist pores which sometimes lower the strength so heavily that the required strength can not be satisfied. However, the glass-ceramic long-lasting phosphors made according to the invention have not such pores and, therefore, a long-lasting phosphor which is superior in its strength to the ceramic phosphors can be produced and applications of such long-lasting phosphor can thereby be broadened.

BRIEF DESCRIPTION OF THE DRAWINGS

In the accompanying drawings.

EXAMPLES

Examples of the present invention will be described below. It is to be noted that the present invention is not limited by these examples.

I. Examples of the long-lasting phosphors having the chemical compositions of $RO \cdot a(Al_{1-x}Ga_x)_2O_3 \cdot b(Y_{1-y}Sc_y)_2O_3 \cdot cB_2O_3 \cdot dEu^{2+} \cdot eM^{n+}$

Example 1

| | |
|---|---|
| $CaCO_3$ | 7.22 g |
| $Al_2O_3$ | 7.37 g |
| $Y_2O_3$ | 0.03 g |
| $H_3BO_3$ | 0.18 g |
| $Eu_2O_3$ | 0.10 g |
| $Nd_2O_3$ | 0.10 g |

The materials of the above composition were mixed sufficiently and sintered in the mixed gas flow of $97N_2 + 3H_2$ under the temperature of 1350° C. for two hours whereby a long-lasting phosphor having the chemical composition $CaO \cdot Al_2O_3 \cdot 0.002Y_2O_3 \cdot 0.02B_2O_3 \cdot 0.004Eu_2O_3 \cdot 0.004Nd_2O_3$ was produced. This long-lasting phosphor exhibits an emission peak at about 440 nm. A blue phosphorescence was observed with the naked eye and the phosphorescence was recognized for over 24 hours in the dark.

Examples 2 to 10

Figure 1:
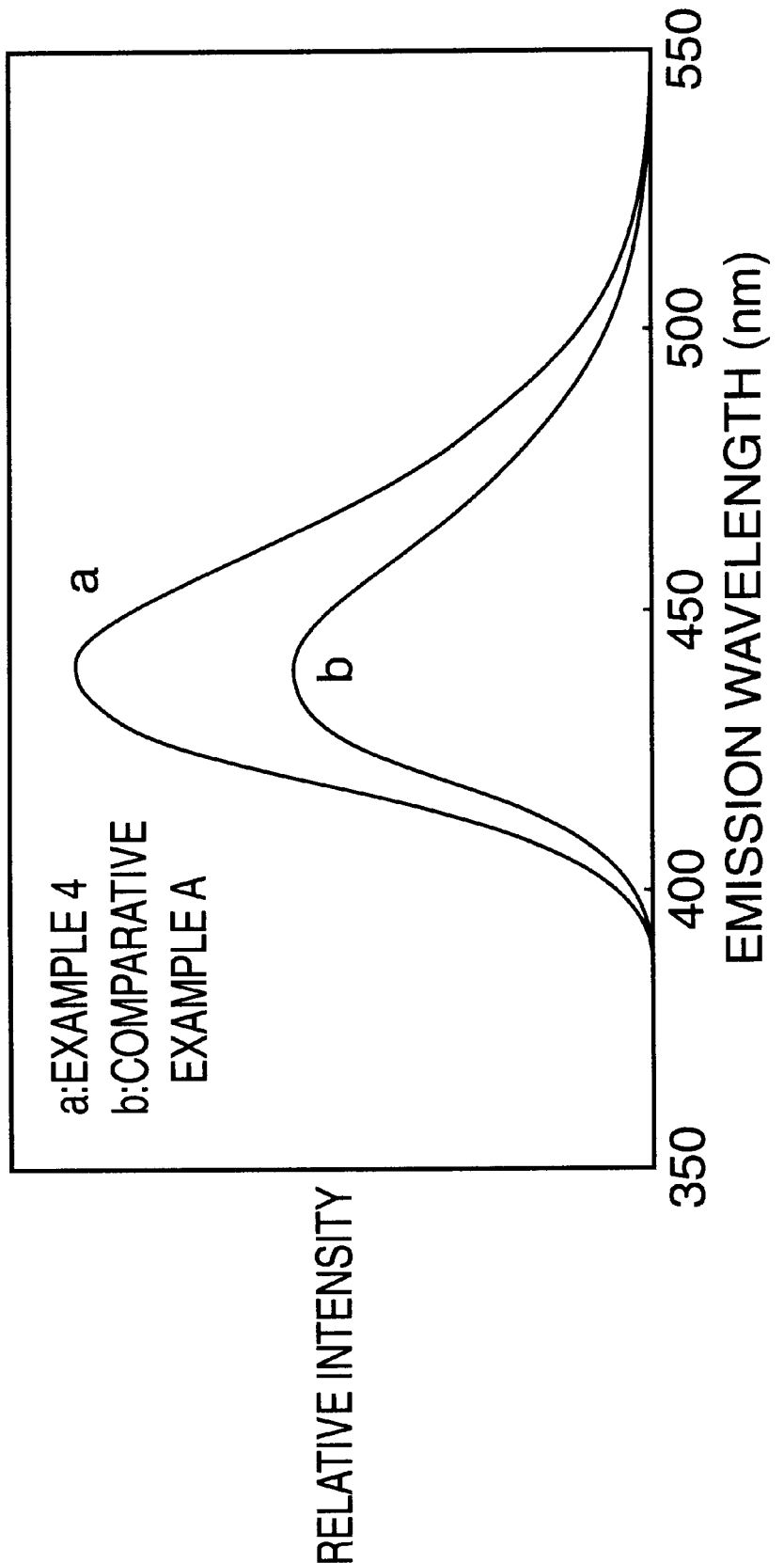
FIG. 1 is a graph showing the emission spectra of Example 4 and Comparative Example A upon after ten minutes after stoppage of the excitation.

Long-lasting phosphors of Examples 2 to 10 and Comparative Example A having the same color of phosphorescence were produced by employing the same method as employed for producing the phosphor of Example 1. The compositions thereof are listed in Table 1. From X-ray diffraction analyses, it has been found that the long-lasting phosphors of these Examples comprise the $CaAl_2O_4$ and $Ca(Eu, Nd, Y)Al(Al_2O_7)$ crystals. The phosphorescence brightness of these Examples and Comparative Example was measured by luminance meter after irradiation at illuminance of 200 lux for four minutes with D65 light source (FL20S·D-EDL-D65 made by Toshiba Litec K.K.) The following Table 1 shows the composition of the respective phosphors and their relative brightness at ten minutes after stoppage of the excitation with respect to the phosphorescence brightness of Comparative Example A which is expressed as 100. In Table 1 and subsequent tables, "Comparative Example" is abbreviated as "Com.". FIG. 1 shows emission spectra of Example 4 and Comparative Example A at ten minutes after stoppage of the excitation. It is evident from Table 1 and FIG. 1 that introducing $Y_2O_3$ into the prior art blue phosphorescence phosphors results in remarkable enhancement of phosphorescence brightness or emission intensity. Furthermore, the phosphorescence emitted by Example 2 to 10 could be recognized for over 24 hours in the dark.

Figure 2:
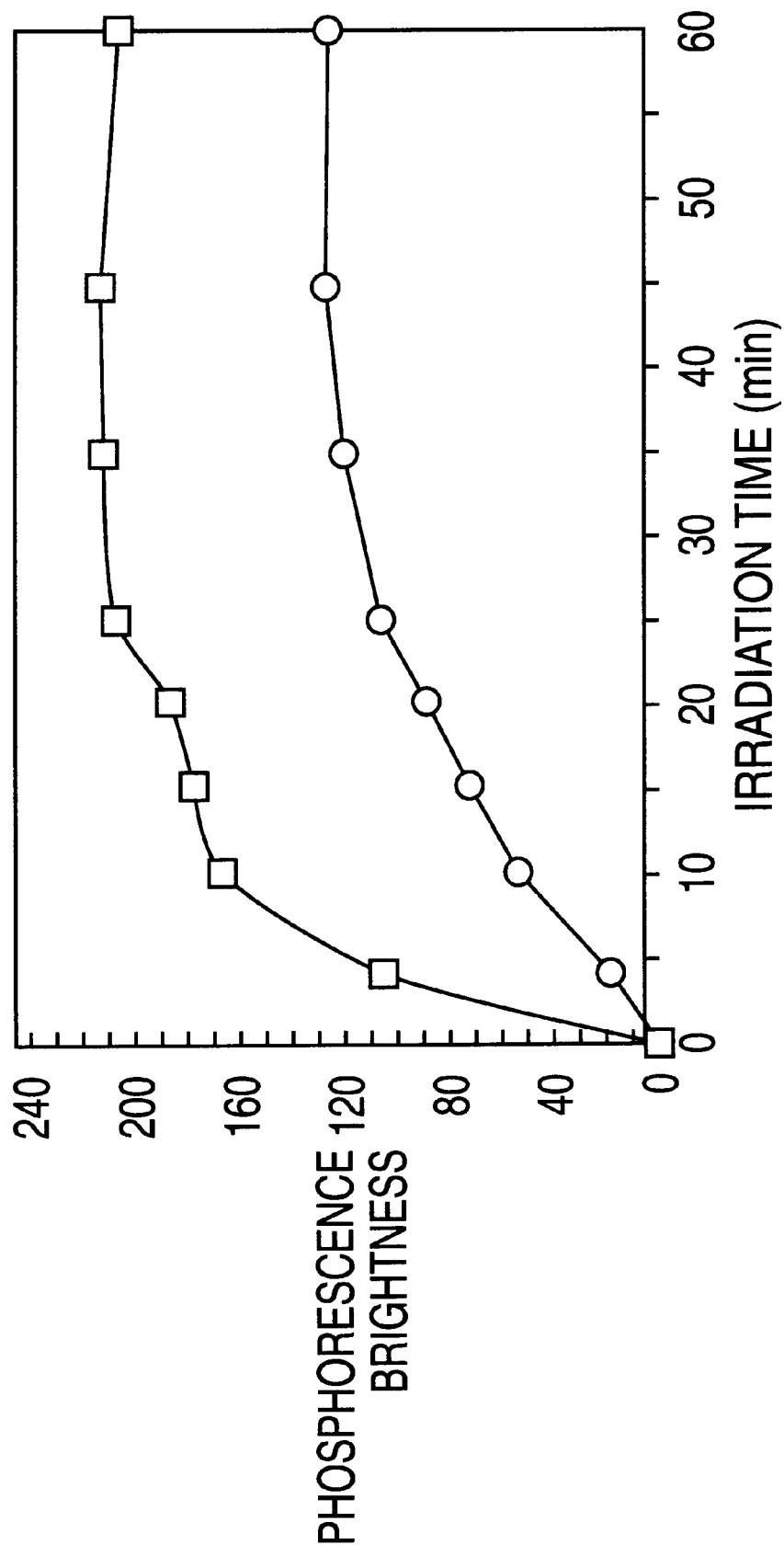
FIG. 2 is a graph showing change phosphorescence brightness as a function of the excitation time after stoppage of the excitation.

FIG. 2 shows phosphorescence brightness as a function of the excitation time in Example 4 and Comparative Example A immediately after stoppage of excitation. The above described light source was used and the illuminance employed was 200 lux. As can be seen, tt takes about 45 minutes for the prior art long-lasting phosphor to reach saturation brightness whereas it takes only about 20 minutes for the long-lasting phosphor of the present invention to reach saturation brightness. For reaching about 80% of the saturated phosphorescence brightness, it takes about 25 minutes for the prior art long-lasting phosphor whereas it takes only about 10 minutes in the long-lasting phosphor of the present invention. From these results, it has become apparent that the long-lasting phosphor according to the present invention comprising the $Y_2O_3$ not only has a higher phosphorescence brightness but also has shorter excitation time which is reduced by half or over by efficiently absorbing excitation light.

TABLE 1

| Example No. | Composition | Relative intensity |
|---|---|---|
| 1 | $CaO \cdot Al_2O_2 \cdot 0.002\ Y_2O_3 \cdot 0.02\ B_2O_3 \cdot 0.004\ Eu_2O_3 \cdot 0.004\ Nd_2O_3$ | 120 |
| 2 | $CaO \cdot Al_2O_3 \cdot 0.004\ Y_2O_3 \cdot 0.02\ B_2O_3 \cdot 0.004\ Eu_2O_3 \cdot 0.004\ Nd_2O_3$ | 160 |
| 3 | $CaO \cdot Al_2O_3 \cdot 0.006\ Y_2O_3 \cdot 0.02\ B_2O_3 \cdot 0.004\ Eu_2O_3 \cdot 0.004\ Nd_2O$ | 220 |
| 4 | $CaO \cdot Al_2O_3 \cdot 0.01\ Y_2O_3 \cdot 0.02\ B_2O_3 \cdot 0.004\ Eu_2O_3 \cdot 0.004\ Nd_2O_3$ | 240 |
| 5 | $CaO \cdot Al_2O_3 \cdot 0.02\ Y_2O_3 \cdot 0.02\ B_2O_3 \cdot 0.004\ Eu_2O_3 \cdot 0.004\ Nd_2O_3$ | 220 |
| 6 | $CaO \cdot Al_2O_3 \cdot 0.04\ Y_2O_3 \cdot 0.02\ B_2O_3 \cdot 0.004\ Eu_2O_3 \cdot 0.004\ Nd_2O_3$ | 180 |
| 7 | $CaO \cdot Al_2O_3 \cdot 0.08\ Y_2O_3 \cdot 0.02\ B_2O_3 \cdot 0.004\ Eu_2O_3 \cdot 0.004\ Nd_2O_3$ | 160 |
| 8 | $CaO \cdot 0.98\ Al_2O_3 \cdot 0.02\ Ga_2O_3 \cdot 0.01\ Y_2O_3 \cdot 0.02\ B_2O_3 \cdot 0.004\ Eu_2O_3 \cdot 0.004\ Nd_2O_3$ | 210 |
| 9 | $CaO \cdot 0.96\ Al_2O_3 \cdot 0.04\ Ga_2O_3 \cdot 0.01\ Y_2O_3 \cdot 0.02\ B_2O_3 \cdot 0.004\ Eu_2O_3 \cdot 0.004\ Nd_2O_3$ | 190 |
| 10 | $CaO \cdot 0.92\ Al_2O_3 \cdot 0.08\ Ga_2O_3 \cdot 0.01\ Y_2O_3 \cdot 0.02\ B_2O_3 \cdot 0.004\ Eu_2O_3 \cdot 0.004\ Nd_2O_3$ | 150 |
| Com. A | $CaO \cdot Al_2O_3 \cdot 0.02\ B_2O_3 \cdot 0.004\ Eu_2O_3 \cdot 0.004\ Nd_2O_3$ | 100 |

Examples 11 to 17

Long-lasting phosphors of Examples 11 to 17 and corresponding Comparative Examples 11 to 17 in which Pr, Sm, Gd, Ho, Er, Tm or Lu was added respectively as an auxiliary activator in addition to the auxiliary activator Nd were produced by employing the same method as employed for producing the long-lasting phosphor of Example 1 and relative phosphorescence brightness of these phosphors at ten minutes after stoppage of excitation was measured. The following Table 2 shows the compositions of the respective Examples and Comparative Examples and results of the relative phosphorescence brightness. From these results, it is found that the long-lasting phosphors according to the invention exhibit a higher phosphorescence brightness than the prior art long-lasting phosphors. The phosphorescence emitted by Examples 11 to 17 was observed for over 24 hours in the dark.

TABLE 2

| Example No. | Composition | Relative intensity |
|---|---|---|
| 11 | $CaO \cdot Al_2O_3 \cdot 0.005\ Y_2O_3 \cdot 0.02\ B_2O_3 \cdot 0.004\ Eu_2O_3 \cdot 0.002\ Nd_2O_3 \cdot 0.0006\ Pr_5O_{11}$ | 150 |
| Com. 11 | $CaO \cdot Al_2O_3 \cdot 0.02\ B_2O_3 \cdot 0.004\ Eu_2O_3 \cdot 0.002\ Nd_2O_3 \cdot 0.0006\ Pr_6O_{11}$ | 100 |
| 12 | $CaO \cdot Al_2O_3 \cdot 0.01\ Y_2O_3 \cdot 0.02\ B_2O_3 \cdot 0.004\ Eu_2O_3 \cdot 0.002\ Nd_2O_3 \cdot 0.002\ Sm_2O_3$ | 160 |
| Com. 12 | $CaO \cdot Al_2O_3 \cdot 0.02\ B_2O_3 \cdot 0.004\ Eu_2O_3 \cdot 0.002\ Nd_2O_3 \cdot 0.002\ Sm_2O_3$ | 100 |
| 13 | $CaO \cdot Al_2O_3 \cdot 0.01\ Y_2O_3 \cdot 0.02\ B_2O_3 \cdot 0.004\ Eu_2O_3 \cdot 0.002\ Nd_2O_3 \cdot 0.002\ Gd_2O_3$ | 170 |
| Com. 13 | $CaO \cdot Al_2O_3 \cdot 0.02\ B_2O_3 \cdot 0.004\ Eu_2O_3 \cdot 0.002\ Nd_2O_3 \cdot 0.002\ Gd_2O_3$ | 100 |
| 14 | $CaO \cdot Al_2O_3 \cdot 0.01\ Y_2O_3 \cdot 0.02\ B_2O_3 \cdot 0.004\ Eu_2O_3 \cdot 0.002\ Nd_2O_3 \cdot 0.002\ Ho_2O_3$ | 120 |
| Com. 14 | $CaO \cdot Al_2O_3 \cdot 0.02\ B_2O_3 \cdot 0.004\ Eu_2O_3 \cdot 0.002\ Nd_2O_3 \cdot 0.002\ Ho_2O_3$ | 100 |
| 15 | $CaO \cdot Al_2O_3 \cdot 0.01\ Y_2O_3 \cdot 0.02\ B_2O_3 \cdot 0.002\ Nd_2O_3 \cdot 0.002\ Er_2O_3$ | 150 |
| Com. 15 | $CaO \cdot Al_2O_3 \cdot 0.02\ B_2O_3 \cdot 0.004\ Eu_2O_3 \cdot 0.002\ Nd_2O_3 \cdot 0.002\ Er_2O_3$ | 100 |
| 16 | $CaO \cdot Al_2O_3 \cdot 0.01\ Y_2O_3 \cdot 0.02\ B_2O_3 \cdot 0.004\ Eu_2O_3 \cdot 0.002\ Nd_2O_3 \cdot 0.002\ Tm_2O_3$ | 270 |
| Com. 16 | $CaO \cdot Al_2O_3 \cdot 0.02\ B_2O_3 \cdot 0.004\ Eu_2O_3 \cdot 0.002\ Nd_2O_3 \cdot 0.002\ Tm_2O_3$ | 100 |
| 17 | $CaO \cdot Al_2O_3 \cdot 0.01\ Y_2O_3 \cdot 0.02\ B_{23} \cdot 0.004\ Eu_2O_3 \cdot 0.002\ Nd_2O_3 \cdot 0.002\ Lu_2O_3$ | 115 |
| Com. 17 | $CaO \cdot Al_2O_3 \cdot 0.02\ B_2O_3 \cdot 0.004\ Eu_2O_3 \cdot 0.002\ Nd_2O_3 \cdot 0.002\ Lu_2O_3$ | 100 |

Example 18

| | |
|---|---|
| $SrCO_3$ | 8.64 g |
| $Al_2O_3$ | 5.97 g |
| $Y_2O_3$ | 0.03 g |
| $H_3BO_3$ | 0.14 g |
| $Eu_2O_3$ | 0.10 g |
| $Dy_2O_3$ | 0.11 g |

The materials of the above composition were mixed sufficiently and sintered in the mixed gas flow of $97N_2+3H_2$ under the temperature of 1350° C. for two hours whereby a long-lasting phosphor having the chemical composition $SrO \cdot Al_2O_3 \cdot 0.002Y_2O_3 \cdot 0.02B_2O_3 \cdot 0.005Eu_2O_3 \cdot 0.005Dy_2O_3$ was produced. This phosphor gave an emission peak at about 520 nm. A yellowish green phosphorescence was observed with the naked eye and the phosphorescence was recognized for over 24 hours in the dark.

Examples 19 to 23

Figure 3:
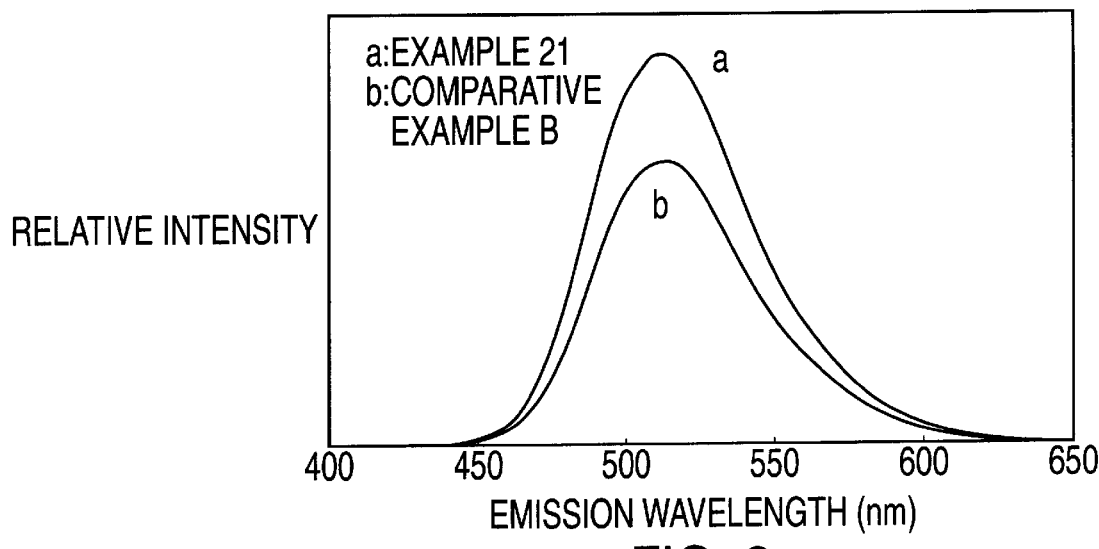
FIG. 3 is a graph showing the emission spectra of Example 21 and Comparative Example B at one minute after stoppage of the excitation.

Long-lasting phosphors of Examples 19 to 23 and Comparative Example B having phosphorescence of the same color group were produced by employing the same method as employed for producing the phosphor of Example 18. The following Table 3 show the compositions of these Examples and Comparative Example and relative phosphorescence brightness at one minute after stoppage of the excitation. From X-ray diffraction analyses, it has been found that the obtained long-lasting phosphors comprise the $SrAl_2O_4$ and $(Eu, Dy, Y)AlO_3$ crystals. FIG. 3 shows emission spectra of Example 21 and Comparative Example B at one minute after stoppage of the excitation. It can be seen from Table 3 and FIG. 3 that the phosphor of the present invention comprising $Y_2O_3$ exhibits a higher phosphorescence brightness and a stronger emission. From Table 3, it is also apparent that the phosphorescence brightness is further improved by addition of Li. The phosphorescence of the phosphors of Examples 19 to 23 was observed for over 24 hours in the dark.

TABLE 3

| Example No. | Composition | Relative intensity |
|---|---|---|
| 18 | $SrO \cdot Al_2O_3 \cdot 0.002\ Y_2O_3 \cdot 0.02\ B_2O_3 \cdot 0.005\ Eu_2O_3 \cdot 0.005\ Dy_2O_3$ | 110 |
| 19 | $SrO \cdot Al_2O_3 \cdot 0.006\ Y_2O_3 \cdot 0.02\ B_2O_3 \cdot 0.005\ Eu_2O_3 \cdot 0.005\ Dy_2O_3$ | 105 |
| 20 | $SrO \cdot Al_2O_3 \cdot 0.004\ Y_2O_3 \cdot 0.02\ B_2O_3 \cdot 0.004\ Li_2O \cdot 0.005\ Eu_2O_3 \cdot 0.005\ Dy_2O_3$ | 115 |
| 21 | $SrO \cdot Al_2O_3 \cdot 0.008\ Y_2O_3 \cdot 0.02\ B_2O_3 \cdot 0.004\ Li_2O \cdot 0.005\ Eu_2O_3 \cdot 0.005\ Dy_2O_3$ | 120 |
| 22 | $SrO \cdot Al_2O_3 \cdot 0.020\ Sc_2O_3 \cdot 0.02\ B_2O_3 \cdot 0.005\ Eu_2O_3 \cdot 0.005\ Dy_2O_3$ | 130 |
| 23 | $SrO \cdot Al_2O_3 \cdot 0.032\ Sc_2O_3 \cdot 0.02\ B_2O_3 \cdot 0.005\ Eu_2O_3 \cdot 0.005\ Dy_2O_3$ | 122 |
| Com. B | $SrO \cdot Al_2O_3 \cdot 0.02\ B_2O_3 \cdot 0.005\ Eu_2O_3 \cdot 0.005\ Dy_2O_3$ | 100 |

Example 24

| | |
|---|---|
| $SrCO_3$ | 6.58 g |
| $Al_2O_3$ | 7.95 g |
| $Y_2O_3$ | 0.03 g |
| $H_3BO_3$ | 0.30 g |
| $Eu_2O_3$ | 0.07 g |
| $Dy_2O_3$ | 0.07 g |

The materials of the above composition were mixed sufficiently and sintered in the mixed gas flow of $97N_2+3H_2$ under the temperature of 1450° C. for two hours whereby a long-lasting phosphor having the chemical composition $SrO \cdot 1.75Al_2O_3 \cdot 0.003Y_2O_3 \cdot 0.06B_2O_3 \cdot 0.004Eu_2O_3 \cdot 0.004Dy_2O_3$ was produced. This phosphor gave an emission peak at about 490 nm. A bluish green phosphorescence was observed with the naked eye and the phosphorescence was recognized for over 24 hours in the dark.

Examples 25 to 28

Figure 4:
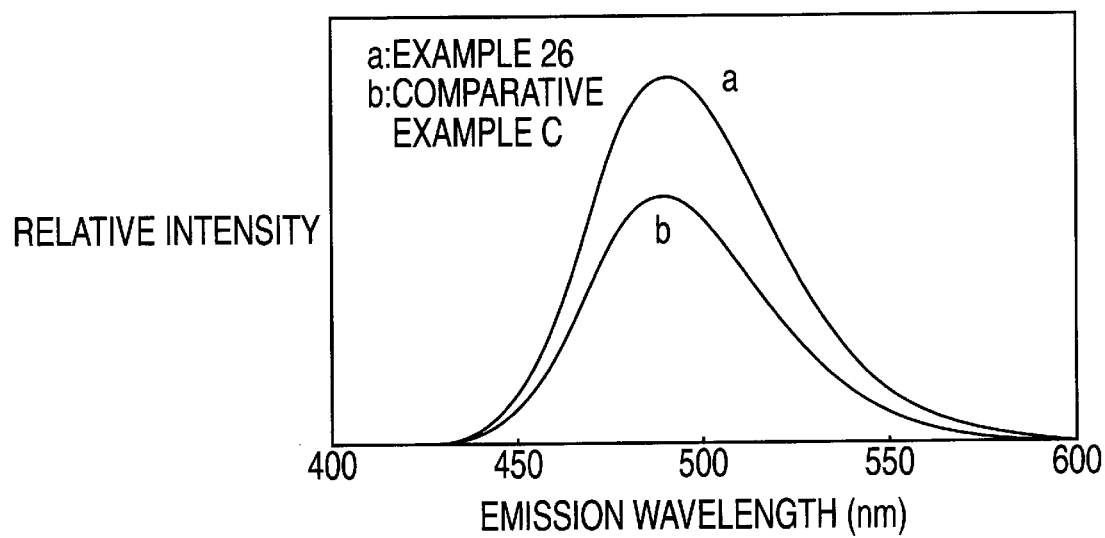
FIG. 4 is a graph showing the emission spectra of Example 26 and Comparative Example C at one minute after stoppage of the excitation.

Long-lasting phosphors of Examples 25 to 28 and Comparative Example C having the same color of phosphorescence were produced by employing the same method as employed for producing the phosphor of Example 24. The following Table 4 show the compositions of these Examples and Comparative Example and relative phosphorescence brightness at one minute after stoppage of the excitation. X-ray diffraction analyses reveals that the obtained long-lasting phosphors comprise the $Sr_4Al_{14}O_{25}$, $SrAl_2O_4$ and $Al_5(Eu, Dy, Y)_3O_{12}$ crystals. FIG. 4 shows emission spectra of Example 26 and Comparative Example C at one minute after stoppage of the excitation. It can be seen from Table 4 and FIG. 4 that the phosphor of the present invention in which $Y_2O_3$ is added exhibits a higher phosphorescence brightness and stronger emission intensity than the prior art phosphor. The phosphorescence of Examples 25 to 28 was observed for over 24 hours in the dark.

Figure 5:
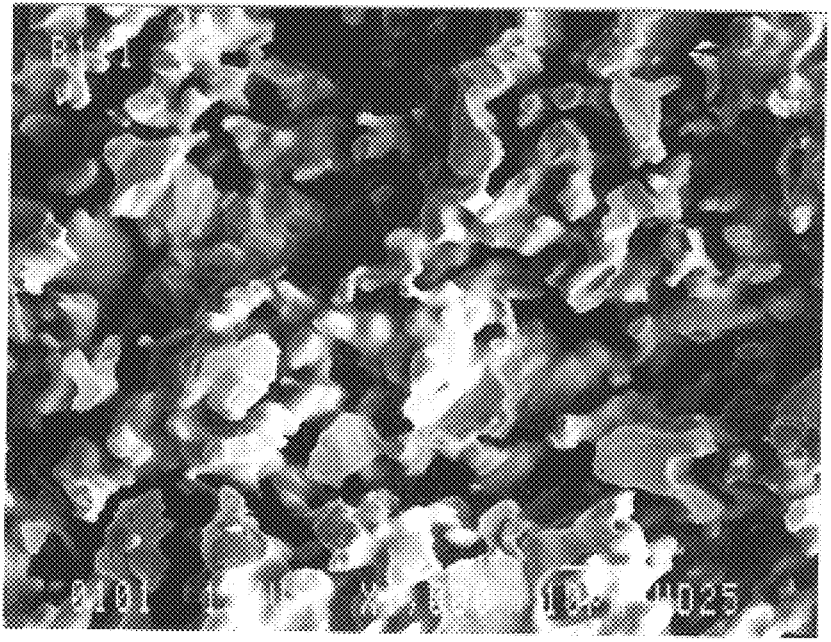
FIG. 5 is SEM photograph of Comparative Example C.
Figure 6:
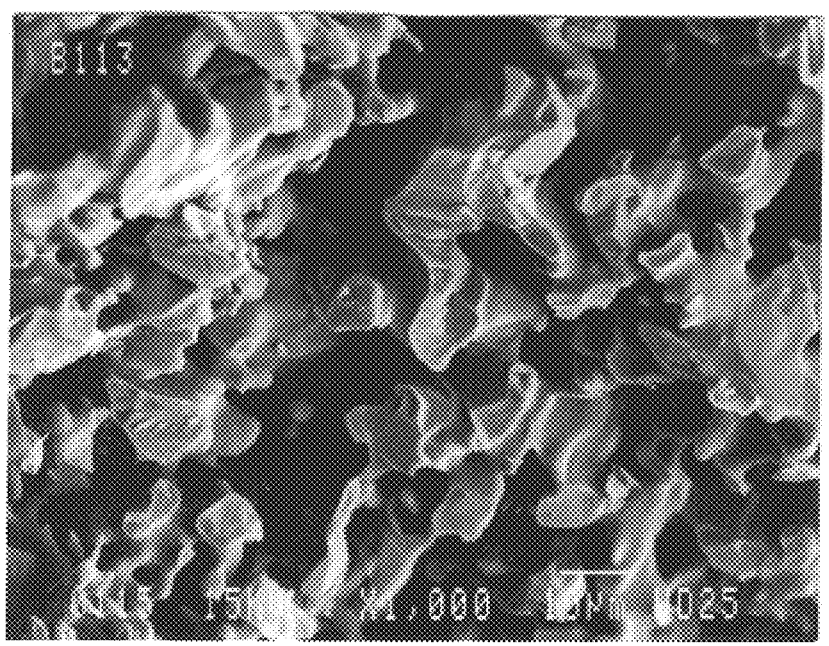
FIG. 6 is SEM photograph of Example 25.
Figure 7:
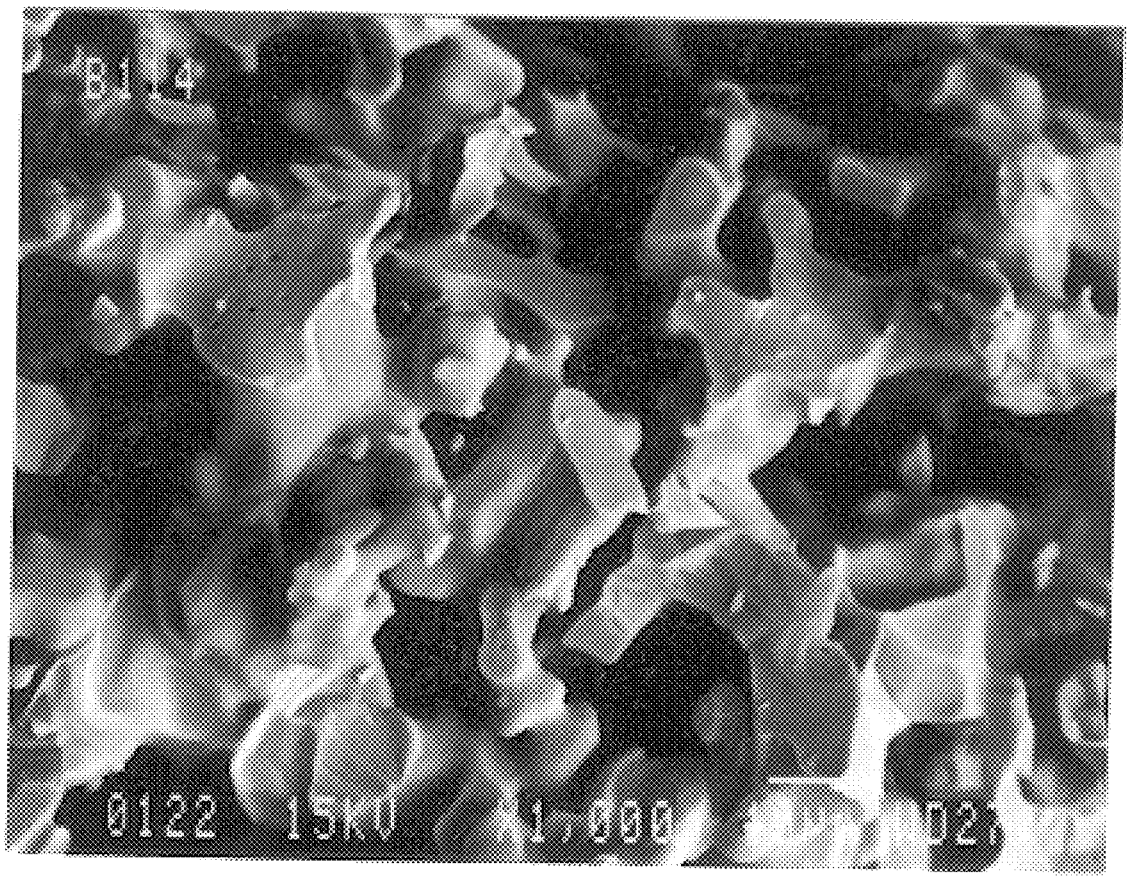
FIG. 7 is SEM photograph of Example 27.

SEM photographs of Comparative Example C. Example 25 and Example 27 are shown in FIGS. 5, 6 and 7, respectively. Evidently, the phosphors of the present invention possess much larger grain size than the prior art one.

TABLE 4

| Example No. | Composition | Relative intensity |
|---|---|---|
| 24 | $SrO \cdot 1.75\ Al_2O_3 \cdot 0.003\ Y_2O_3 \cdot 0.06\ B_2O_3 \cdot 0.004\ Eu_2O_3 \cdot 0.004\ Dy_2O_3$ | 110 |
| 25 | $SrO \cdot 1.75\ Al_2O_3 \cdot 0.007\ Y_2O_3 \cdot 0.06\ B_2O_3 \cdot 0.004\ Eu_2O_3 \cdot 0.004\ Dy_2O_3$ | 130 |
| 26 | $SrO \cdot 1.75\ Al_2O_3 \cdot 0.011\ Y_2O_3 \cdot 0.06\ B_2O_3 \cdot 0.004\ Eu_2O_3 \cdot 0.004\ Dy_2O_3$ | 158 |
| 27 | $SrO \cdot 1.75\ Al_2O_3 \cdot 0.014\ Y_2O_3 \cdot 0.06\ B_2O_3 \cdot 0.004\ Eu_2O_3 \cdot 0.004\ Dy_2O_3$ | 160 |
| 28 | $SrO \cdot 1.75\ Al_2O_3 \cdot 0.022\ Y_2O_3 \cdot 0.06\ B_2O_3 \cdot 0.004\ Eu_2O_3 \cdot 0.004\ Dy_2O_3$ | 140 |
| Com. C | $SrO \cdot 1.75\ Al_2O_3 \cdot 0.06\ B_2O_3 \cdot 0.004\ Eu_2O_3 \cdot 0.004\ Dy_2O_3$ | 100 |

Light resistance test

Long-lasting phosphors are often used in the state exposed to the sun light and, therefore, long-lasting phosphors are required to have a high light resistance to the sunlight, particularly ultraviolet ray contained therein. A light resistance test using a mercury arc lamp of 300W was conducted on the long-lasting phosphors made according to the invention in accordance with the test method applicable to light resistance of luminous paint (JIS standard). As a result, no deterioration in the phosphorescence brightness was observed in any of the specimens tested.

II. Examples of the long-lasting phosphors having the chemical composition of $RO \cdot a(Al_{1-x}Ga_x)_2O_3 \cdot b(Si_{1-y}Ge_y)O_2 \cdot cEu^{2+} \cdot dM^{n+}$ Example 29

| | |
|---|---|
| $SrCO_3$ | 5.69 g |
| $Al_2O_3$ | 3.93 g |
| $SiO_2$ | 4.63 g |
| $H_3BO_3$ | 0.19 g |
| $Eu_2O_3$ | 0.27 g |
| $Dy_2O_3$ | 0.29 g |

Figure 8:
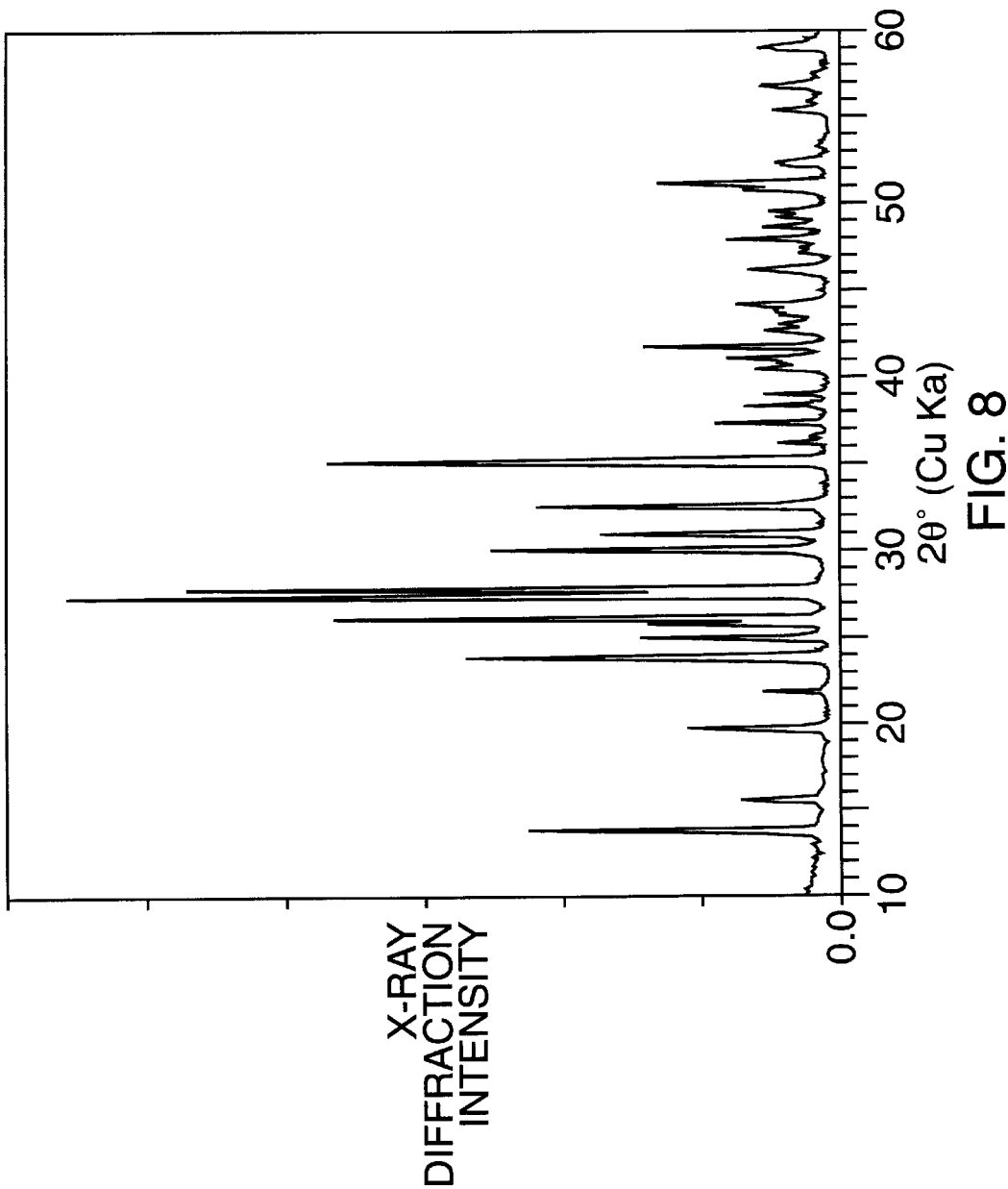
FIG. 8 is a graph showing the X-ray diffraction pattern of Example 29.
Figure 9:
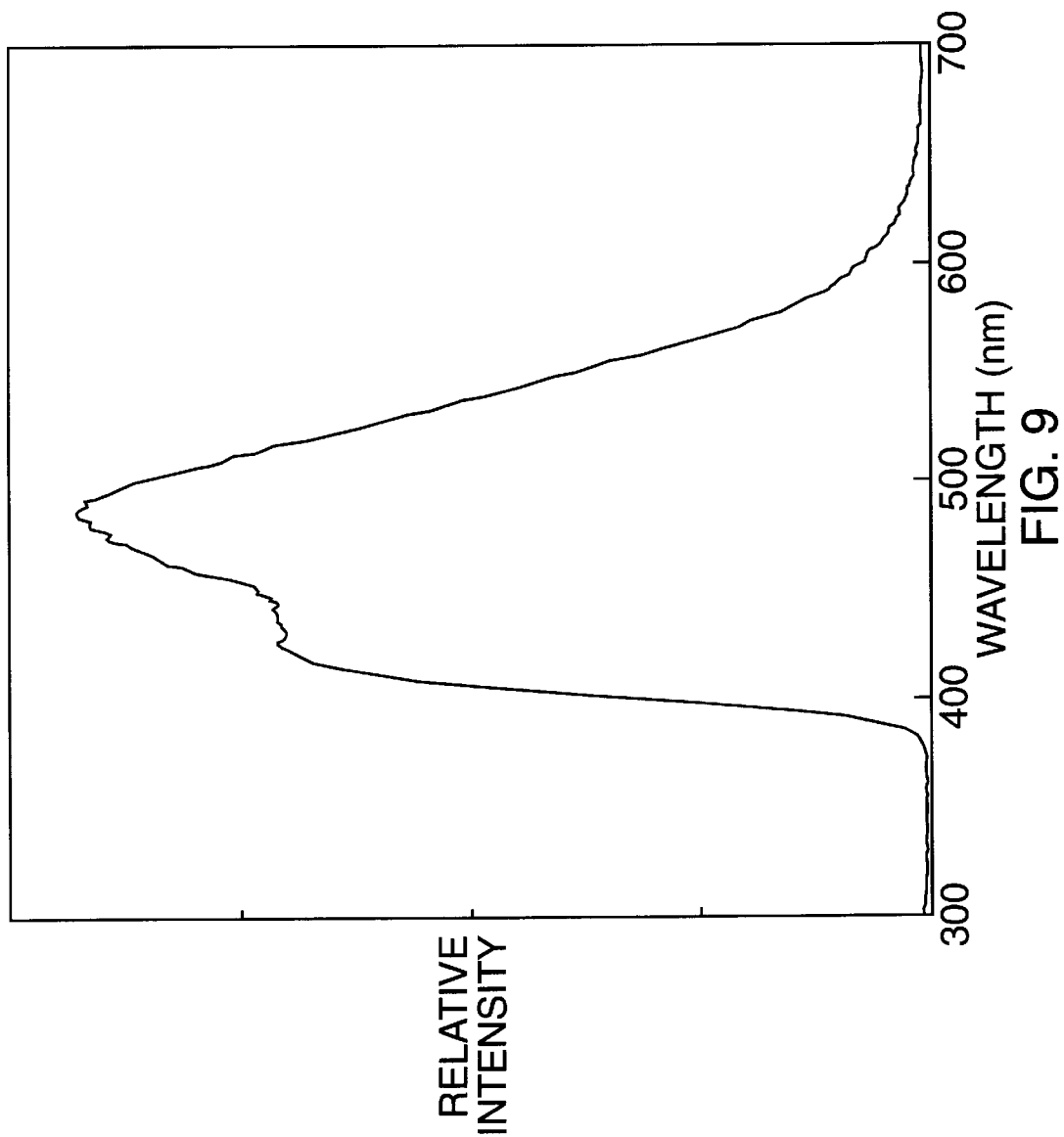
FIG. 9 is a graph showing the emission spectrum of Example 29 at ten minutes after stoppage of the excitation.

The materials of the above composition were mixed sufficiently and sintered in the mixed gas flow of $97N_2+3H_2$ under the temperature of 1350° C. for two hours whereby a long-lasting phosphor having the chemical composition $SrO \cdot Al_2O_3 \cdot 2.00SiO_2 \cdot 0.04B_2O_3 \cdot 0.020Eu_2O_3 \cdot 0.020Dy_2O_3$ was produced. It was found from analysis of the X-ray diffraction pattern shown in FIG. 8 that this long-lasting phosphor was composed of a $SrAl_2Si_2O_8$ phase. FIG. 9 shows an emission spectrum at ten minutes after stoppage of the excitation. This long-lasting phosphor had emission peaks at about 420 nm and 485 nm. No such an emission characteristic was observed in the prior art long-lasting phosphors. A white phosphorescence was observed with the naked eye and the phosphorescence was recognized for over 24 hours in the dark.

Example 30

| | |
|---|---|
| $CaCO_3$ | 4.42 g |
| $Al(OH)_3$ | 6.90 g |
| $SiO_2$ | 5.30 g |
| $H_3BO_3$ | 0.22 g |
| $Eu_2O_3$ | 0.19 g |
| $Nd_2O_3$ | 0.36 g |

Figure 10:
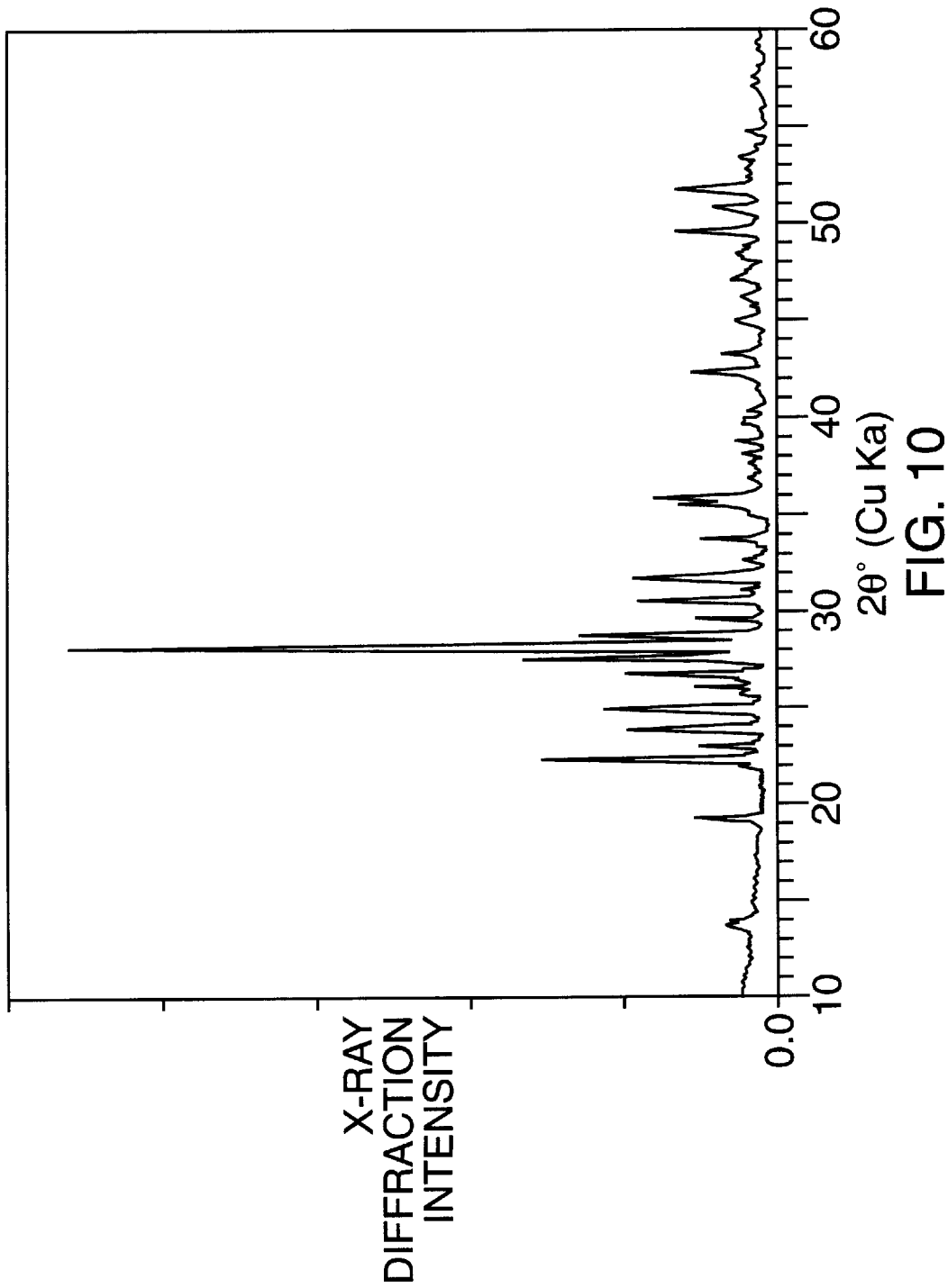
FIG. 10 is a graph showing the X-ray diffraction pattern of Example 30.
Figure 11:
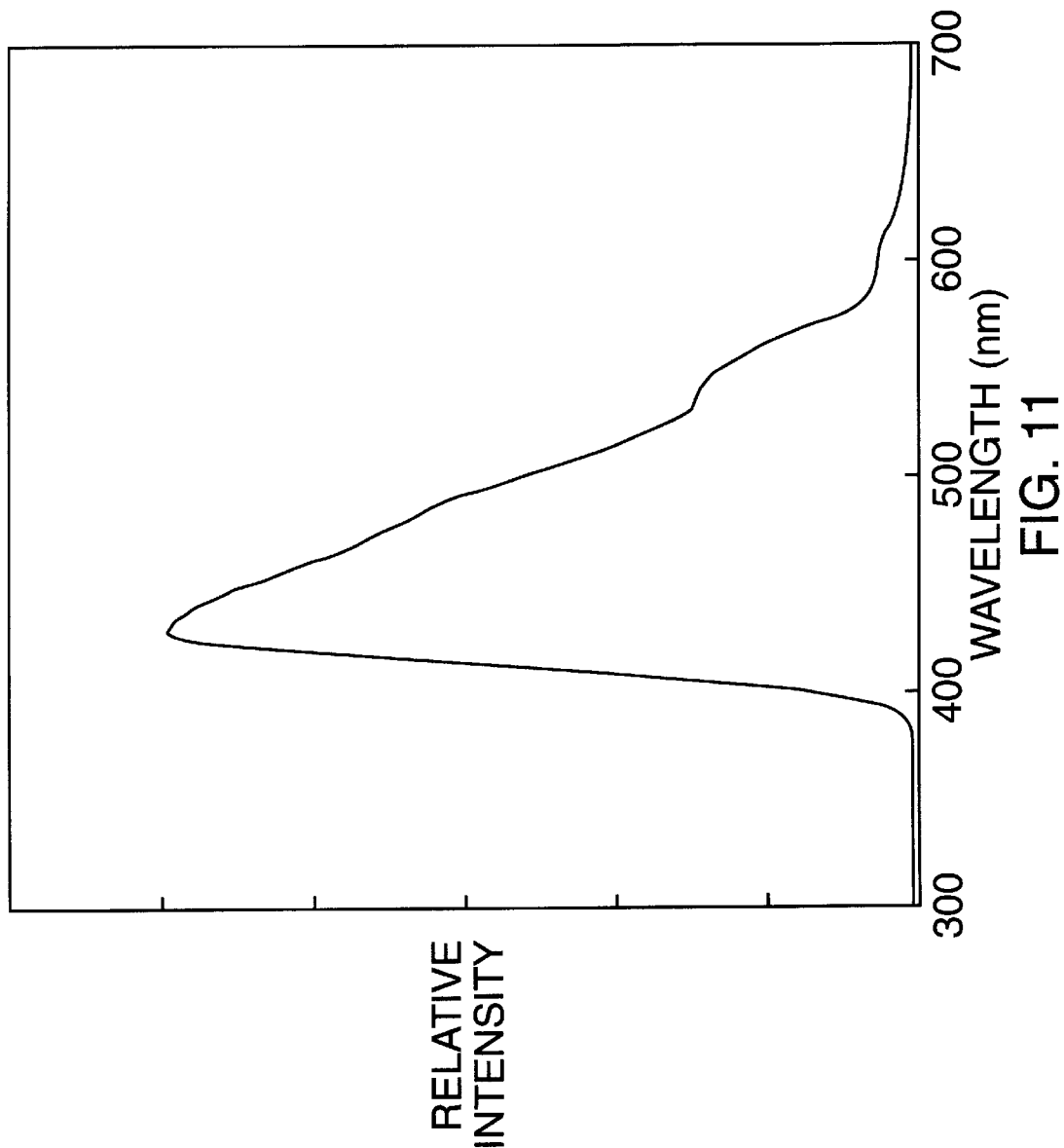
FIG. 11 is a graph showing the emission spectrum of Example 30 at ten minutes after stoppage of the excitation of Example 30.

The materials of the above composition were mixed sufficiently and sintered in the mixed gas flow of $97N_2+3H_2$ under the temperature of 1350° C. for two hours whereby a long-lasting phosphor having the chemical composition $CaO \cdot Al_2O_3 \cdot 2.00SiO_2 \cdot 0.04B_2O_3 \cdot 0.012Eu_2O_3 \cdot 0.024Nd_2O_3$ was produced. It was found from the X-ray diffraction pattern analyses shown in FIG. 10 that this long-lasting phosphor was composed of a $CaAl_2Si_2O_8$ phase. FIG. 11 shows an emission spectrum at ten minutes after stoppage of the excitation. This long-lasting phosphor gave two emission peaks at about 425 nm and 540 nm. The emission character is different from that of the prior art phosphors. A bluish violet phosphorescence was observed with the naked eye and the phosphorescence was recognized for over 24 hours in the dark.

Example 31

| | |
|---|---|
| $CaCO_3$ | 4.39 g |
| $Al_2O_3$ | 4.27 g |
| $Ga_2O_3$ | 0.20 g |
| $SiO_2$ | 4.45 g |
| $NH_4H_2PO_4$ | 1.76 g |
| $Eu_2O_3$ | 0.18 g |
| $Nd_2O_3$ | 0.34 g |

The materials of the above composition were mixed sufficiently and sintered in the mixed gas flow of $97N_2+3H_2$ under the temperature of 1350° C. for two hours whereby a long-lasting phosphor having the chemical composition $CaO \cdot 0.95Al_2O_3 \cdot 1.69SiO_2 \cdot 0.02Ga_2O_3 \cdot 0.17P_2O_5 \cdot 0.012Eu_2O_3 \cdot 0.023Nd_2O_3$ was produced. This long-lasting phosphor was composed of a $CaAl_2Si_2O_8$ phase. This long-lasting phosphor gave a similar emission characteristic as shown in FIG. 11. A bluish violet phosphorescence was observed with the naked eye and the phosphorescence was recognized for over 24 hours in the dark.

Example 32

| | |
|---|---|
| $CaCO_3$ | 7.11 g |
| $Al_2O_3$ | 7.25 g |
| $SiO_2$ | 0.02 g |
| $H_3BO_3$ | 0.18 g |
| $Eu_2O_3$ | 0.15 g |
| $Nd_2O_3$ | 0.29 g |

The materials of the above composition were mixed sufficiently and sintered in the mixed gas flow of $97N_2+3H_2$ under the temperature of 1350° C. for two hours whereby a long-lasting phosphor having the chemical composition $CaO \cdot Al_2O_3 \cdot 0.005SiO_2 \cdot 0.02B_2O_3 \cdot 0.006Eu_2O_3 \cdot 0.012Nd_2O_3$ was produced. This long-lasting phosphor have an emission peak at about 440 nm. A bluish violet phosphorescence was observed with the naked eye and the phosphorescence was recognized for over 24 hours in the dark.

Figure 12:
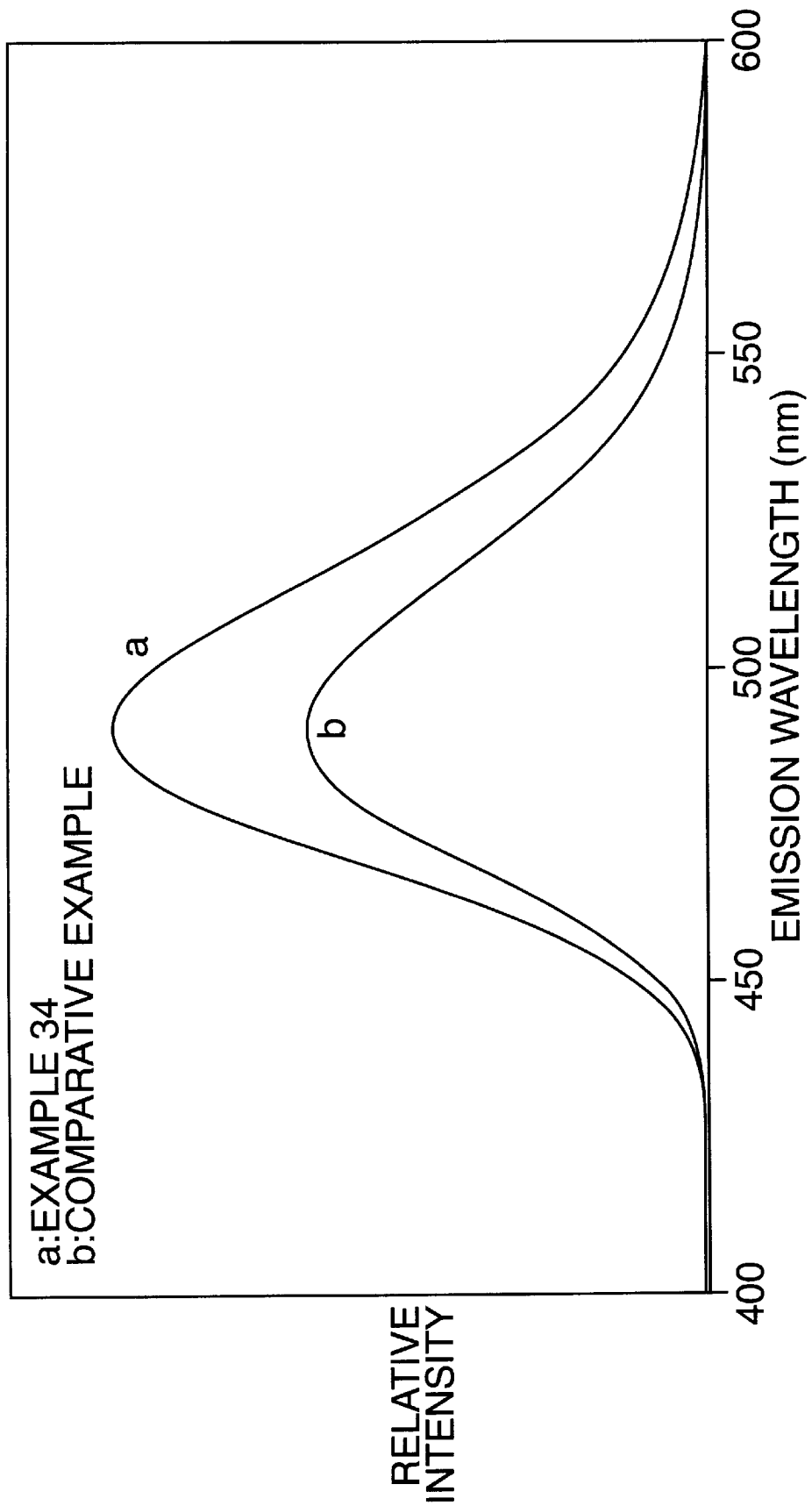
FIG. 12 is a graph showing the emission spectra of Example 34 and its comparative example at ten minutes after stoppage of the excitation.

Long-lasting phosphors of Examples 33 to 38 and a comparative example which does not include $SiO_2$ were produced by employing the same method as employed for producing Example 32. Table 5 shows compositions of Examples 32 to 38. FIG. 12 shows emission spectra of Example 34 and the comparative example at ten minutes after stoppage of excitation. It will be understood from the figure that the long-lasting phosphors according to the invention have a stronger emission intensity than the comparative example. The phosphorescence of these long-lasting phosphors was recognized for over 24 hours in the dark.

TABLE 5

| Example | Composition |
|---|---|
| 32 | $CaO \cdot Al_2O_3 \cdot 0.005\ SiO_2 \cdot 0.02\ B_2O_3 \cdot 0.006\ Eu_2O_3 \cdot 0.012\ Nd_2O_3$ |
| 33 | $CaO \cdot Al_2O_3 \cdot 0.009\ SiO_2 \cdot 0.02\ B_2O_3 \cdot 0.006\ Eu_2O_3 \cdot 0.012\ Nd_2O_3$ |
| 34 | $CaO \cdot Al_2O_3 \cdot 0.014\ SiO_2 \cdot 0.02\ B_2O_3 \cdot 0.006\ Eu_2O_3 \cdot 0.012\ Nd_2O_3$ |
| 35 | $CaO \cdot Al_2O_3 \cdot 0.028\ SiO_2 \cdot 0.02\ B_2O_3 \cdot 0.006\ Eu_2O_3 \cdot 0.012\ Nd_2O_3$ |
| 36 | $CaO \cdot Al_2O_3 \cdot 0.036\ SiO_2 \cdot 0.02\ B_2O_3 \cdot 0.006\ Eu_2O_3 \cdot 0.012\ Nd_2O_3$ |
| 37 | $CaO \cdot Al_2O_3 \cdot 0.040\ SiO_2 \cdot 0.02\ B_2O_3 \cdot 0.006\ Eu_2O_3 \cdot 0.012\ Nd_2O_3$ |
| 38 | $CaO \cdot Al_2O_3 \cdot 0.048\ SiO_2 \cdot 0.02\ B_2O_3 \cdot 0.006\ Eu_2O_3 \cdot 0.012\ Nd_2O_3$ |
| Com. | $CaO \cdot Al_2O_3 \cdot 0.02\ B_2O_3 \cdot 0.006\ Eu_2O_3 \cdot 0.012\ Nd_2O_3$ |

Long-lasting phosphors of Examples 39 to 44 in which Ce, Pr, Gd, Er, Tm or Lu was added as an auxiliary activator in addition to the auxiliary activator Nd and corresponding comparative examples were produced by employing the same method as employed for producing Example 32. Table 6 shows compositions of these examples and comparative examples.

TABLE 6

| Example | Composition |
|---|---|
| 39 | $CaO \cdot Al_2O_3 \cdot 0.012\ SiO_2 \cdot 0.02\ B_2O_3 \cdot 0.004\ Eu_2O_3 \cdot 0.002\ Nd_2O_3 \cdot 0.002\ CeO_2$ |
| Com. 39 | $CaO \cdot Al_2O_3 \cdot 0.02\ B_2O_3 \cdot 0.004\ Eu_2O_3 \cdot 0.002\ Nd_2O_3 \cdot 0.002\ CeO_2$ |
| 40 | $CaO \cdot Al_2O_3 \cdot 0.008\ SiO_2 \cdot 0.02\ B_2O_3 \cdot 0.004\ Eu_2O_3 \cdot 0.002\ Nd_2O_3 \cdot 0.0006\ Pr_6O_{11}$ |
| Com. 40 | $CaO \cdot Al_2O_3 \cdot 0.02\ B_2O_3 \cdot 0.004\ Eu_2O_3 \cdot 0.002\ Nd_2O_3 \cdot 0.0006\ Pr_6O_{11}$ |
| 41 | $CaO \cdot Al_2O_3 \cdot 0.012\ SiO_2 \cdot 0.02\ B_2O_3 \cdot 0.004\ Eu_2O_3 \cdot 0.002\ Nd_2O_3 \cdot 0.002\ Gd_2O_3$ |
| Com. 41 | $CaO \cdot Al_2O_3 \cdot 0.02\ B_2O_3 \cdot 0.004\ Eu_2O_3 \cdot 0.002\ Nd_2O_3 \cdot 0.002\ Gd_2O_3$ |
| 42 | $CaO \cdot Al_2O_3 \cdot 0.012\ SiO_2 \cdot 0.02\ B_2O_3 \cdot 0.004\ Eu_2O_3 \cdot 0.002\ Nd_2O_3 \cdot 0.002\ Er_2O_3$ |
| Com. 42 | $CaO \cdot Al_2O_3 \cdot 0.02\ B_2O_3 \cdot 0.004\ Eu_2O_3 \cdot 0.002\ Nd_2O_3 \cdot 0.002\ Er_2O_3$ |
| 43 | $CaO \cdot Al_2O_3 \cdot 0.012\ SiO_2 \cdot 0.02\ B_2O_3 \cdot 0.004\ Eu_2O_3 \cdot 0.002\ Nd_2O_3 \cdot 0.002\ Tm_2O_3$ |
| Com. 43 | $CaO \cdot Al_2O_3 \cdot 0.02\ B_2O_3 \cdot 0.004\ Eu_2O_3 \cdot 0.002\ Nd_2O_3 \cdot 0.002\ Tm_2O_3$ |
| 44 | $CaO \cdot Al_2O_3 \cdot 0.012\ SiO_2 \cdot 0.02\ B_2O_3 \cdot 0.004\ Eu_2O_3 \cdot 0.002\ Nd_2O_3 \cdot 0.002\ Lu_2O_3$ |
| Com. 44 | $CaO \cdot Al_2O_3 \cdot 0.02\ B_2O_3 \cdot 0.004\ Eu_2O_3 \cdot 0.002\ Nd_2O_3 \cdot 0.002\ Lu_2O_3$ |

Example 45

| | |
|---|---|
| $SrCO_3$ | 14.39 g |
| $Al_2O_3$ | 14.95 g |

-continued

| | |
|---|---|
| SiO$_2$ | 0.02 g |
| GeO$_2$ | 0.02 g |
| Li$_2$CO$_3$ | 0.02 g |
| H$_3$BO$_3$ | 0.30 g |
| Eu$_2$O$_3$ | 0.12 g |
| Dy$_2$O$_3$ | 0.14 g |

Figure 13:
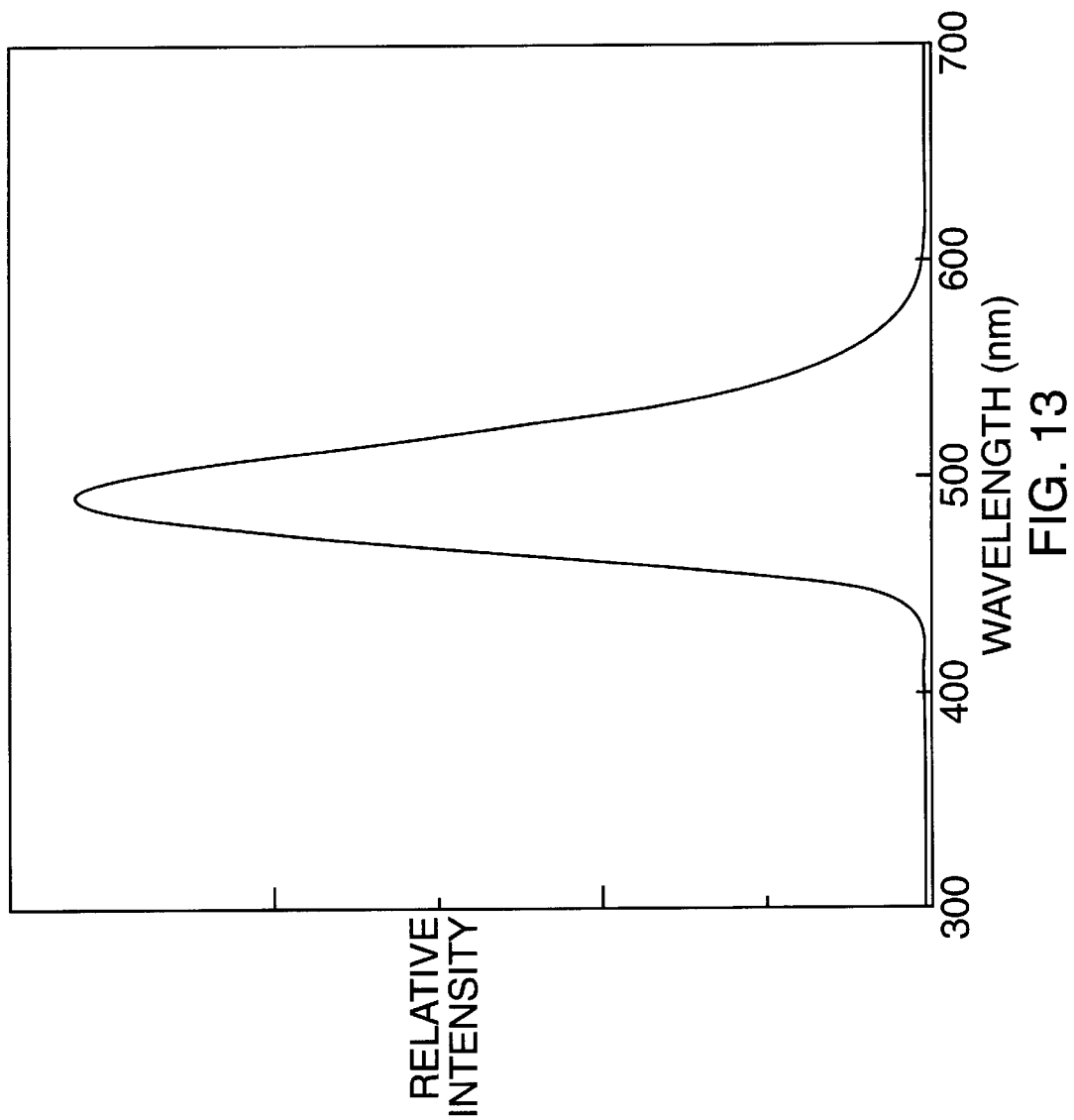
FIG. 13 is a graph showing the emission spectrum of Example 45 at ten minutes after stoppage of the excitation.

The materials of the above composition were mixed sufficiently and sintered in the mixed gas flow of 97N$_2$+3H$_2$ under the temperature of 1400° C. for two hours whereby a long-lasting phosphor having the chemical composition SrO·1.50Al$_2$O$_3$·0.003SiO$_2$·0.002GeO$_2$·0.003Li$_2$O·0.025B$_2$O$_3$·0.004Eu$_2$O$_3$·0.004Dy$_2$O$_3$ was produced. FIG. 13 shows an emission spectrum at ten minutes after stoppage of excitation. This long-lasting phosphor exhibited an emission characteristic having a peak at about 490 nm. A bluish green phosphorescence was observed with the naked eye and the phosphorescence was recognized for over 24 hours in the dark.

Example 46

| | |
|---|---|
| SrCO$_3$ | 8.39 g |
| Al$_2$O$_3$ | 5.80 g |
| GeO$_2$ | 0.24 g |
| H$_3$BO$_3$ | 0.14 g |
| Eu$_2$O$_3$ | 0.20 g |
| Dy$_2$O$_3$ | 0.22 g |

Figure 14:
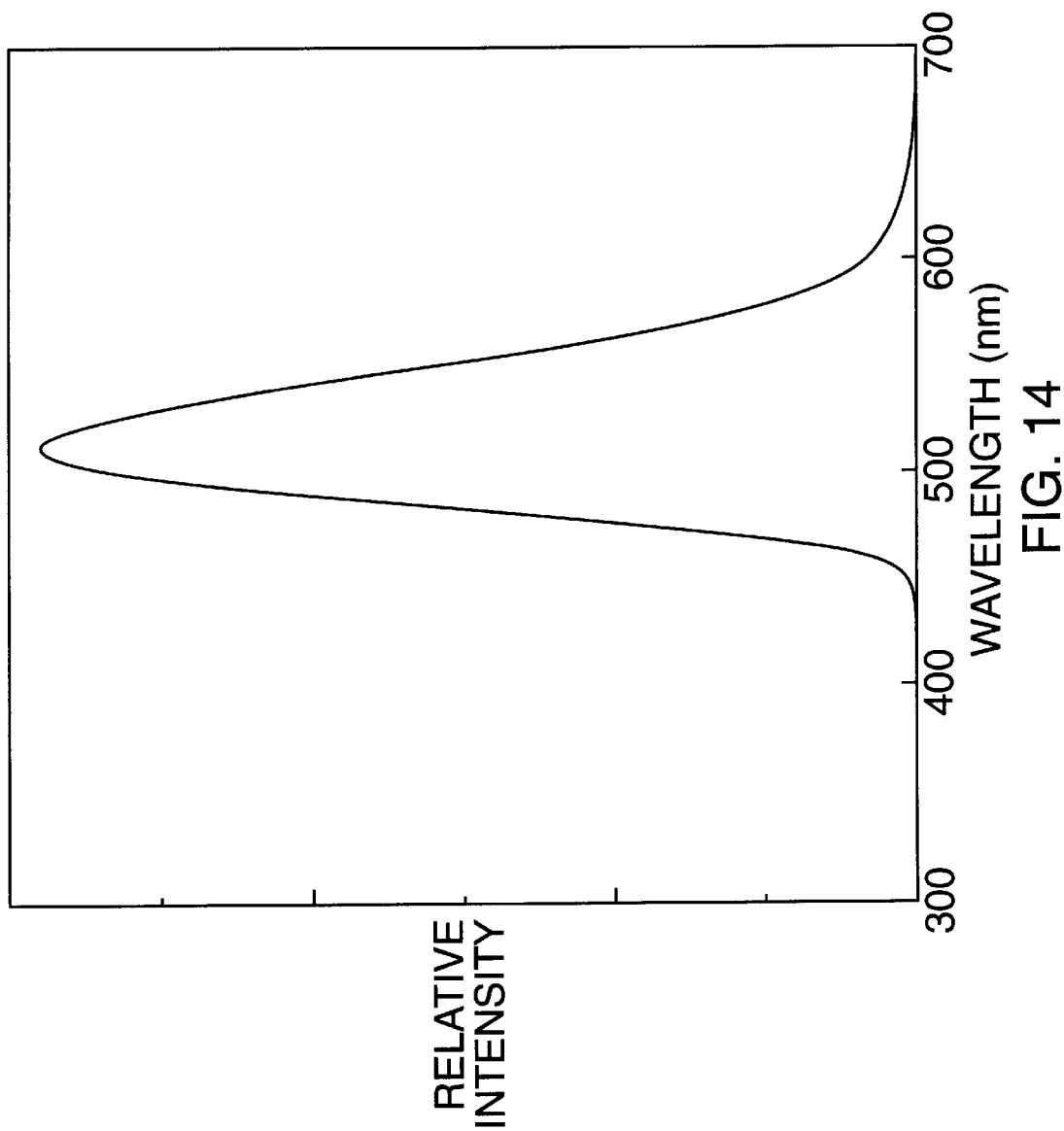
FIG. 14 is a graph showing the emission spectrum of Example 46 at ten minutes after stoppage of excitation.
Figure 15:
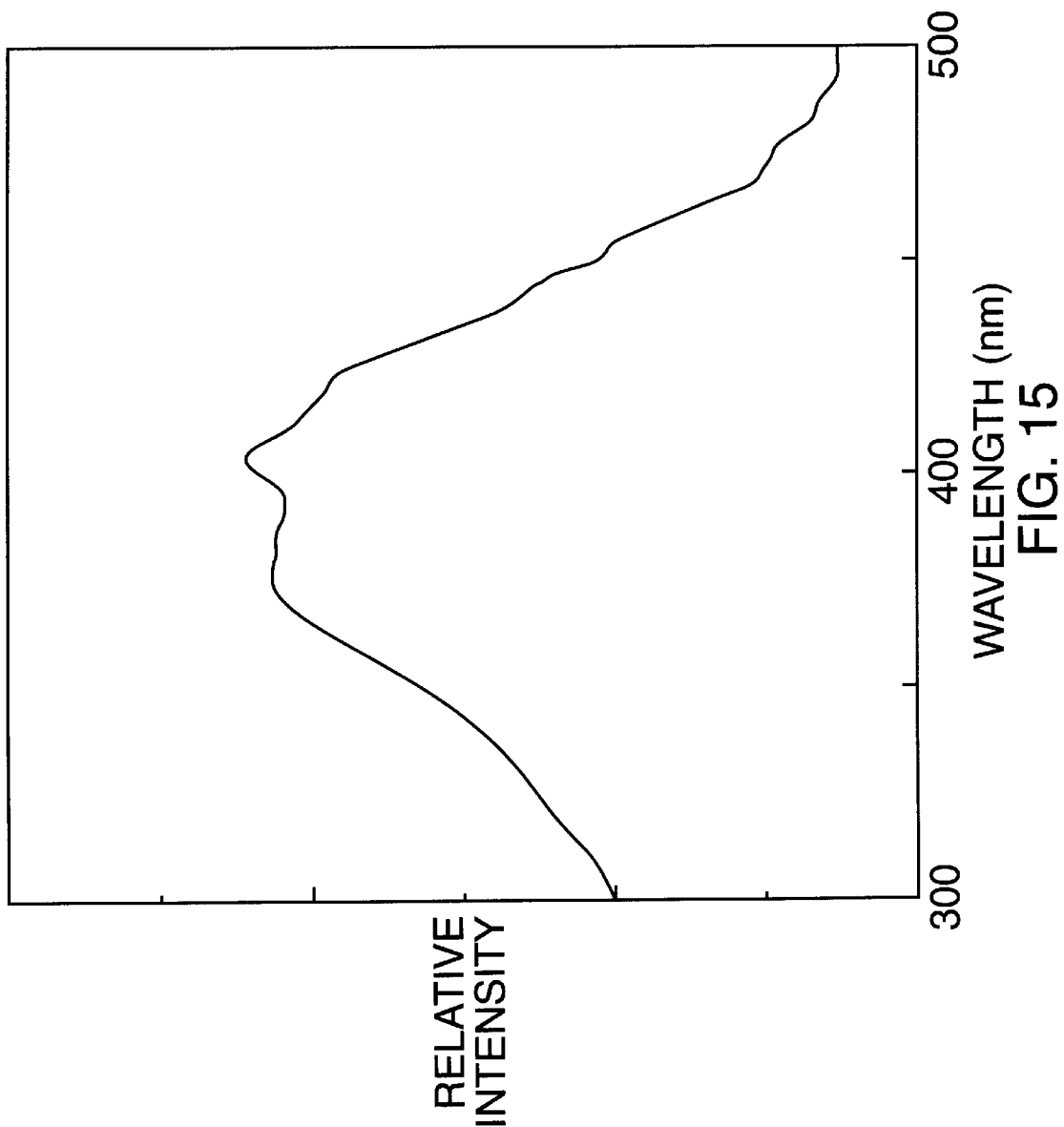
FIG. 15 is a graph showing the excitation spectrum, the emission wavelength at 515 nm being monitored.

The materials of the above composition were mixed sufficiently and sintered in the mixed gas flow of 97N$_2$+3H$_2$ under the temperature of 1350° C. for two hours whereby a long-lasting phosphor having the chemical composition SrO·Al$_2$O$_3$·0.04GeO$_2$·0.020B$_2$O$_3$·0.010Eu$_2$O$_3$·0.010Dy$_2$O$_3$ was produced. FIG. 14 shows an emission spectrum at ten minutes after stoppage of excitation. This long-lasting phosphor exhibited an emission characteristic having a peak at about 515 nm. A yellowish green phosphorescence was observed with the naked eye and the phosphorescence was recognized for over 24 hours in the dark. FIG. 15 shows the excitation spectrum for the emission wavelength 515 nm. Broad excitation band with two peaks at 370 nm and 405 nm could be observed. The occurrence of the excitation band at 405 nm indicates that the phosphor of this invention is more sensitive to the visible ray.

Example 47

| | |
|---|---|
| MgO | 1.86 g |
| CaCO$_3$ | 1.92 g |
| Sr(NO$_3$)$_2$ | 12.99 g |
| Al(OH)$_3$ | 8.99 g |
| SiO$_2$ | 11.52 g |
| Eu$_2$O$_3$ | 0.81 g |
| Dy$_2$O$_3$ | 0.22 g |
| Si (reducing agent) | 0.22 g |

The materials of the above composition were mixed sufficiently and melted under the temperature of 1500° C. for three hours and cast onto an iron plate whereby a glass having the chemical composition of 0.36MgO·0.15CaO·0.49SrO·0.45Al$_2$O$_3$·1.58SiO$_2$·0.018Eu$_2$O$_3$·0.030Dy$_2$O$_3$ was produced. This glass was subjected to heat treatments in the mixed gas flow of 97N$_2$+3H$_2$ under the temperature of 1150° C. for five hours whereby a glass-ceramic long-lasting phosphor including a SrAl$_2$Si$_2$O$_8$ crystal was produced. This long-lasting phosphor gave a similar emission characteristic as shown in FIG. 9. A white phosphorescence was observed with the naked eye and the phosphorescence was recognized for over 24 hours in the dark.

Example 48

| | |
|---|---|
| MgO | 1.17 g |
| CaCO$_3$ | 10.20 g |
| Al(OH)$_3$ | 6.82 g |
| SiO$_2$ | 11.36 g |
| Eu$_2$O$_3$ | 1.28 g |
| Nd$_2$O$_3$ | 1.23 g |
| Si (reducing agent) | 0.31 g |

Figure 16:
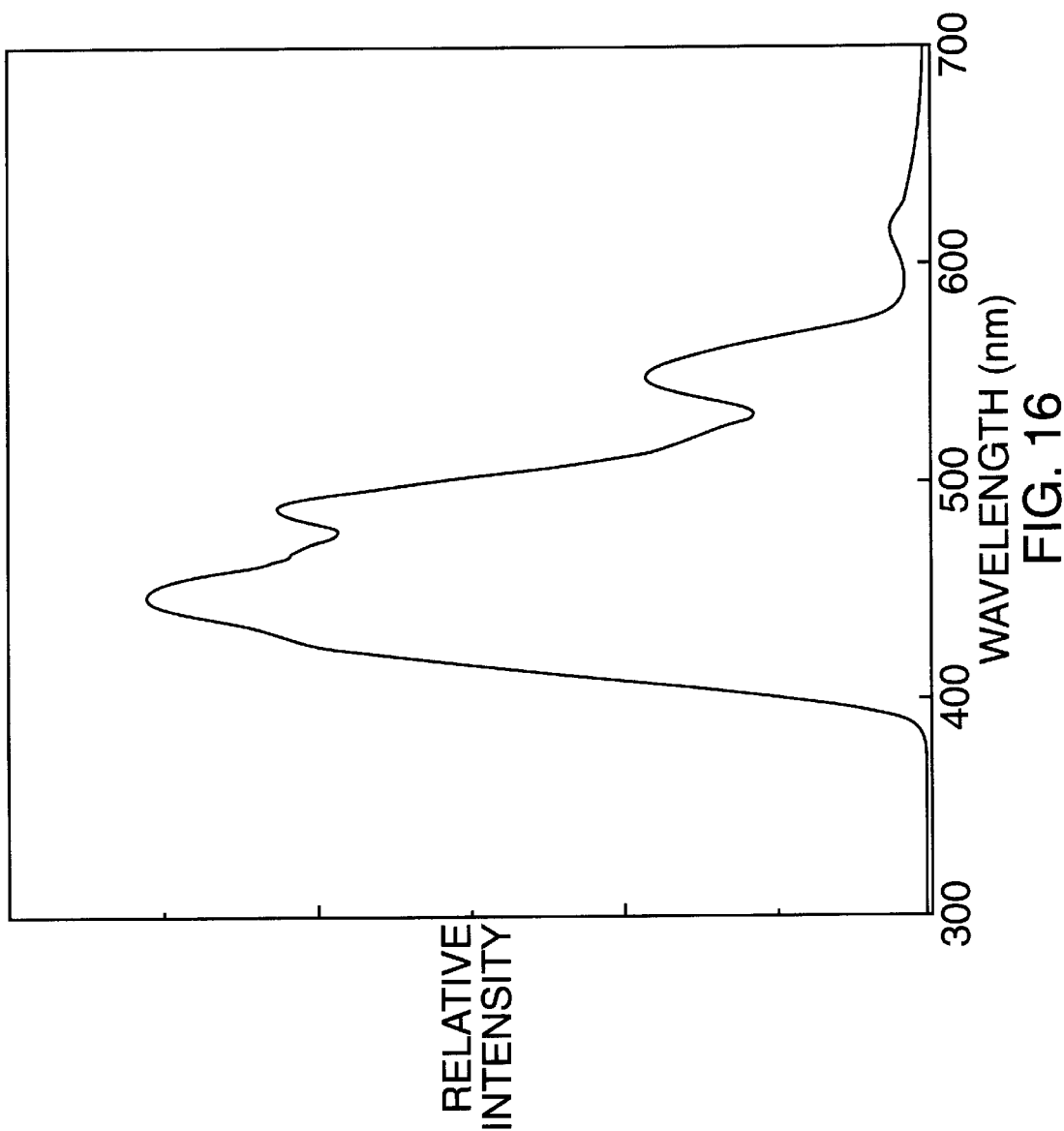
FIG. 16 is a graph showing the emission spectrum of Example 48 at ten minutes after stoppage of the excitation.

The materials of the above composition were mixed sufficiently and melted under the temperature of 1500° C. for three hours and cast onto an iron plate whereby a glass having the chemical composition of 0.22MgO·0.78CaO·0.33Al$_2$O$_3$·1.53SiO$_2$·0.028Eu$_2$O$_3$·0.028Nd$_2$O$_3$ was produced. This glass was subjected to heat treatments in the mixed gas flow of 97N$_2$+3H$_2$ under the temperature of 1100° C. for five hours whereby a glass-ceramic long-lasting phosphor including a CaAl$_2$Si$_2$O$_8$ crystal was produced. FIG. 16 shows the emission spectrum of this long-lasting phosphor at ten minutes after stoppage of excitation. As can be observed from the figure that this long-lasting phosphor gives three emission peaks at about 450 nm, 485 nm and 545 nm. A violet blue phosphorescence was observed with the naked eye and the phosphorescence was recognized for over 24 hours in the dark.

The phosphorescence brightness of Examples 32 to 44 and the comparative example was measured with the same method as described above. The following Table 7 shows relative phosphorescence brightness of Examples 32 to 38 at ten minutes after stoppage of the excitation with respect to that of the comparative example which is expressed as 100. The following Table 8 shows phosphorescence brightness of Examples 39 to 44 at five minutes after stoppage of the excitation with respect to that of the corresponding Comparative Examples 39 to 44 which is expressed as 100 respectively. It will be understood from Tables 7 and 8 that the long-lasting phosphorescence brightness of the long-lasting phosphors of the present invention containing SiO$_2$ is significantly improved over that of the prior art aluminate long-lasting phosphors.

TABLE 7

| Examples | Relative intensity |
|---|---|
| 32 | 150 |
| 33 | 225 |
| 34 | 250 |
| 35 | 220 |
| 36 | 205 |
| 37 | 200 |
| 38 | 175 |
| Comparative Example | 100 |

TABLE 8

| Example | Relative intensity |
|---|---|
| 39 | 115 |
| Com. 39 | 100 |

TABLE 8-continued

| Example | Relative intensity |
|---|---|
| 40 | 200 |
| Com. 40 | 100 |
| 41 | 130 |
| Com. 41 | 100 |
| 42 | 110 |
| Com. 42 | 100 |
| 43 | 225 |
| Com. 43 | 100 |
| 44 | 140 |
| Com. 44 | 100 |

Light resistance test

A light resistance test using a mercury arc lamp of 300 W was conducted on the long-lasting phosphors of Examples 29 to 44 in accordance with the test method applicable to light resistance of luminous paint (JIS standard). As a result, no deterioration in the long-lasting phosphorescence brightness was observed in any of the specimens tested.

What is claimed is:

1. A long-lasting phosphor being activated by divalent europium and having a chemical composition $RO \cdot a(Al_{1-x}Ga_x)_2O_3 \cdot b(Y_{1-y}Sc_y)_2O_3 \cdot cB_2O_3 \cdot dEu^{2+} \cdot eM^{n+}$ (where R is at least one selected from the group consisting of alkaline-earth metals including Ba, Sr, Ca, Mg and Zn, and M is at least one of auxiliary activator selected from the group consisting of Nb, Zr, Bi, Sn, Ce, Pr, Nd, Sm, Gd, Tb, Dy, Ho, Er, Tm, Yb, and Lu, n+ being the ion state of the auxiliary activator with n being an integer) wherein a, b, c, d, e, x and y are within the ranges of:

$0.3 \leq a \leq 8$,
$0 < b \leq 0.2$,
$0.001 \leq c \leq 0.2$,
$0.001 \leq d \leq 0.3$,
$0.001 \leq e \leq 0.3$,
$0 \leq x < 1.0$, and
$0 \leq y \leq 1.0$.

2. A long-lasting phosphor as defined in claim 1 which further comprises 0.001–8 mol % Li.

3. A long-lasting phosphor as defined in claim 1 wherein said long-lasting phosphor has an emission peak at a wavelength in the vicinity of 440 nm and comprises $CaAl_2O_4$ and $Ca(Rm, Y)Al(Al_2O_7)$ crystals (where Rm is at least one element selected from the group consisting of Eu, Dy, Sc, Ce, Pr, Nd, Sm, Gd, Tb, Ho, Er, Tm, Yb and Lu).

4. A long-lasting phosphor as defined in claim 3 wherein said long-lasting phosphor has an emission peak at a wavelength in the vicinity of 440 nm and comprises $CaAl_2O_4$ and $Ca(Eu, Nd, Y)Al(Al_2O_7)$ crystals.

5. A long-lasting phosphor as defined in claim 1 wherein said long-lasting phosphor has an emission peak at a wavelength in the vicinity of 520 nm and comprises $SrAl_2O_4$ and $(Rm, Y)AlO_3$ crystals (where Rm is at least one element selected from the group consisting of Eu, Dy, Sc, Ce, Pr, Nd, Sm, Gd, Tb, Ho, Er, Tm, Yb and Lu).

6. A long-lasting phosphor as defined in claim 5 wherein said long-lasting phosphor has en emission peak at a wavelength in the vicinity of 520 nm and comprises $SrAl_2O_4$ and $(Eu, Dy, Y)AlO_3$ crystals.

7. A long-lasting phosphor as defined in claim 1 wherein said long-lasting phosphor has an emission peak at a wavelength in the vicinity of 490 nm and comprises $Sr_4Al_{14}O_{25}$ and $Al_5(Rm, Y)_3O_{12}$ (where Rm is at least one element selected from the group consisting of Eu, Dy, Sc, Ce, Pr, Nd, Sm, Gd, Tb, Ho, Er, Tm, Yb and Lu).

8. A long-lasting phosphor as defined in claim 7 wherein said long-lasting phosphor has an emission peak at a wavelength in the vicinity of 490 nm and comprises $Sr_4Al_{14}O_{25}$ and $Al_5(Eu, Dy, Y)_3O_{12}$ crystals.

9. A long-lasting phosphor as defined in claim 2 wherein said long-lasting phosphor has an emission peak at a wavelength in the vicinity of 440 nm and comprises $CaAl_2O_4$ and $Ca(Rm, Y)Al(Al_2O_7)$ crystals (where Rm is at least one element selected from the group consisting of Eu, Dy, Sc, La, Ce, Pr, Nd, Sm, Gd, Tb, Ho, Er, Tm, Yb and Lu).

10. A long-lasting phosphor as defined in claim 9 wherein said long-lasting phosphor has an emission peak at a wavelength in the vicinity of 440 nm and comprises $CaAl_2O_4$ and $Ca(Eu, Nd, Y)Al(Al_2O_7)$ crystals.

11. A long-lasting phosphor as defined in claim 2 wherein said long-lasting phosphor has an emission peak at a wavelength in the vicinity of 520 nm and comprises $SrAl_2O_4$ and $(Rm, Y)AlO_3$ crystals (where Rm is at least one element selected from the group consisting of Eu, Dy, Sc, La, Ce, Pr, Nd, Sm, Gd, Tb, Ho, Er, Tm, Yb and Lu).

12. A long-lasting phosphor as defined in claim 11 wherein said long-lasting phosphor has an emission peak at a wavelength in the vicinity of 520 nm and comprises $SrAl_2O_4$ and $(Eu, Dy, Y)AlO_3$ crystals.

13. A long-lasting phosphor as defined in claim 2 wherein said long-lasting phosphor has an emission peak at a wavelength in the vicinity of 490 nm and comprises $Sr_4Al_{14}O_{25}$ and $Al_5(Rm, Y)_3O_{12}$ (where Rm is at least one element selected from the group consisting of Eu, Dy, Sc, La, Ce, Pr, Nd, Sm, Gd, Tb, HO, Er, Tm, Yb and Lu).

14. A long-lasting phosphor as defined in claim 13 wherein said long-lasting phosphor has an emission peak at a wavelength in the vicinity of 490 nm and comprises $Sr_4Al_{14}O_{25}$ and $Al_5(Eu, Dy, Y)_3O_{12}$ crystals.

15. A long-lasting phosphor as defined in claim 1 wherein R is Ca.

16. A long-lasting phosphor as defined in claim 1 wherein R is Sr.

17. A long-lasting phosphor as defined in claim 1 wherein M is Nd.

18. A long-lasting phosphor as defined in claim 1 wherein M is Dy.

19. A long-lasting phosphor as defined in claim 1 wherein x is $0 \leq x \leq 0.5$.

20. A long-lasting phosphor as defined in claim 1 wherein x is within a range of $0 \leq x \leq 0.2$.

21. A long-lasting phosphor as defined in claim 1 wherein y is within a range of $0 \leq y \leq 0.5$.

22. A long-lasting phosphor as defined in claim 1 wherein y is within a range of $0 \leq y \leq 0.2$.

23. A long-lasting phosphor being activated by divalent europium and having a chemical composition $RO \cdot a(Al_{1-x}Ga_x)_2O_3 \cdot b(Si_{1-y}Ge_y)O_2 \cdot cEu^{2+} \cdot dM^{n+}$ (where R is at least one selected from the group consisting of alkaline-earth metals including Ba, Sr, Ca, Mg and Zn, and M is at least one of auxiliary activator selected from the group consisting of Nb, Zr, Bi, Sn, Pr, Nd, Sm, Dy, Ho, Er, Tm, Yb, and Lu, n+ being the ion state of the auxiliary activator with n being an integer) wherein a, b, c, d, x and y are within the ranges of:

$0.3 \leq a \leq 8$,
$0.001 \leq b \leq 2$,
$0.001 \leq c \leq 0.3$,
$0.001 \leq d \leq 0.3$,
$0 \leq x < 1.0$, and
$0 \leq y \leq 1.0$.

24. A long-lasting phosphor as defined in claim 23 wherein R is Sr.

25. A long-lasting phosphor as defined in claim 23 wherein R is Ca.

26. A long-lasting phosphor as defined in claim 23 wherein M is Dy.

27. A long-lasting phosphor as defined in claim 23 wherein M is Nd.

28. A long-lasting phosphor as defined in claim 23 wherein a is within a range of $0.3 \leq a \leq 6$ and b is within a range of $0.001 \leq b \leq 2$.

29. A long-lasting phosphor as defined in claim 23 wherein a is within a range of $0.5 \leq a \leq 3$ and b is within a range of $0.002 \leq b \leq 2$.

30. A long-lasting phosphor as defined in claim 23 wherein c is within a range of $0.001 \leq c \leq 0.2$.

31. A long-lasting phosphor as defined in claim 23 wherein c is within a range of $0.002 \leq c \leq 0.1$.

32. A long-lasting phosphor as defined in claim 23 wherein d is within a range of $0.001 \leq d \leq 0.2$.

33. A long-lasting phosphor as defined in claim 23 wherein d is within a range of $0.002 \leq d \leq 0.15$.

34. A long-lasting phosphor as defined in claim 23 wherein x is within a range of $0 \leq x \leq 0.5$.

35. A long-lasting phosphor as defined in claim 23 wherein x is within a range of $0 \leq x \leq 0.2$.

36. A long-lasting phosphor as defined in claim 23 wherein y is within a range of $0 \leq y \leq 0.5$.

37. A long-lasting phosphor as defined in claim 23 wherein y is within a range of $0 \leq y \leq 0.2$.

38. A glass-ceramic long-lasting phosphors comprising the long-lasting phosphor as defined in claim 23.

39. A long-lasting phosphor being activated by divalent europium and having a chemical composition $RO \cdot a(Al_{1-x}Ga_x)_2O_3 \cdot b(Si_{1-y}Ge_y)O_2 \cdot cEu^{2+} \cdot dM^{n+}$ (where R is at least one selected from the group consisting of alkaline-earth metals including Ba, Sr, Ca, Mg and Zn, and M is at least two auxiliary activators selected from the group consisting of Nb, Zr, Bi, Mn, Sn, La, Ce, Pr, Nd, Sm, Gd, Tb, Dy, Ho, Er, Tm, Yb, and Lu except a combination of two auxiliary activators selected from Mn, La, Ce, Gd and Tb, n+ being the ion state of the auxiliary activator with n being an integer) wherein a, b, c, d, x and y are within the ranges of:

$0.3 \leq a \leq 8$, $0.001 \leq b \leq 2$, $0.001 \leq c \leq 0.3$, $0.001 \leq d \leq 0.3$, $0 \leq x < 1.0$, and $0 \leq y \leq 1.0$.

* * * * *

UNITED STATES PATENT AND TRADEMARK OFFICE
Certificate

Patent No. 6,010,644                                                            Patented: January 4, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of the patent is: Jie Fu, Yasuo Ochi and Susumu Uehara.

Signed and Sealed this Sixth Day of March, 2001.

MARK BELL
*Superviosry Patent Examiner*
Art Unit 1755